United States Patent
Yokote et al.

(10) Patent No.: US 11,818,304 B2
(45) Date of Patent: Nov. 14, 2023

(54) IMAGE FORMING APPARATUS DETERMINING INFORMATION RELATED TO A DENSITY OF AN IMAGE TO BE FORMED BASED ON A DETERMINATION CONDITION

(71) Applicant: CANON KABUSHIKI KAISHA, Tokyo (JP)

(72) Inventors: Akihito Yokote, Chiba (JP); Taichi Takemura, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/953,812

(22) Filed: Sep. 27, 2022

(65) Prior Publication Data
US 2023/0098328 A1 Mar. 30, 2023

(30) Foreign Application Priority Data
Sep. 28, 2021 (JP) ................. 2021-158394

(51) Int. Cl.
*G06K 15/00* (2006.01)
*H04N 1/00* (2006.01)

(52) U.S. Cl.
CPC ..... *H04N 1/00045* (2013.01); *H04N 1/00005* (2013.01); *H04N 1/00031* (2013.01); *H04N 1/00082* (2013.01)

(58) Field of Classification Search
CPC ........... H04N 1/00045; H04N 1/00005; H04N 1/00031; H04N 1/00082
See application file for complete search history.

(56) References Cited

U.S. PATENT DOCUMENTS

| | | |
|---|---|---|
| 5,220,373 A | 6/1993 | Kanaya |
| 6,418,281 B1 | 7/2002 | Ohki |
| 7,072,597 B2 | 7/2006 | Shimura et al. |
| 8,194,299 B2 | 6/2012 | Yamashita et al. |

(Continued)

FOREIGN PATENT DOCUMENTS

| | | |
|---|---|---|
| JP | 05-72859 A | 3/1993 |
| JP | 2000-238341 A | 9/2000 |

(Continued)

OTHER PUBLICATIONS

U.S. Appl. No. 17/863,132, Akihito Yokote Taichi Takemura Saeko Oishi, filed Jul. 12, 2022.
U.S. Appl. No. 17/948,915, Taichi Takemura, filed Sep. 20, 2022.

*Primary Examiner* — Moustapha Diaby
(74) *Attorney, Agent, or Firm* — Venable LLP

(57) ABSTRACT

An image forming apparatus includes an image forming unit to form an image based on an image forming condition and a controller. The controller determines information related to a density of an image to be formed by the image forming unit; generates the image forming condition based on the information; acquires measurement data outputted from a sensor related to a test image; determines, based on a first determination condition, first information related to a density of the test image; determines, based on a second determination condition, second information related to a density of the test image; and selects the determination condition from among a plurality of determination conditions including the first determination condition and the second determination condition.

9 Claims, 20 Drawing Sheets

(56) References Cited

U.S. PATENT DOCUMENTS

| | | | |
|---|---|---|---|
| 8,547,596 | B2 | 10/2013 | Tonami et al. |
| 9,310,742 | B2 | 4/2016 | Shirafuji |
| 9,897,956 | B2 | 2/2018 | Takemura |
| 11,232,332 | B2 | 1/2022 | Yokote |
| 11,378,908 | B2 | 7/2022 | Haga |
| 11,442,388 | B2 | 9/2022 | Yokote |
| 11,516,369 | B2 | 11/2022 | Shiga |
| 2016/0085194 | A1* | 3/2016 | Shirafuji ............ G03G 15/5041 399/49 |
| 2017/0038719 | A1* | 2/2017 | Takemura .......... G03G 15/5062 |
| 2017/0041509 | A1* | 2/2017 | Itagaki ................ H04N 1/6008 |
| 2019/0086851 | A1* | 3/2019 | Takemura .......... G03G 15/5025 |
| 2021/0041822 | A1 | 2/2021 | Yokote |
| 2023/0098328 | A1 | 3/2023 | Yokote et al. |
| 2023/0098673 | A1 | 3/2023 | Shiga |

FOREIGN PATENT DOCUMENTS

| | | |
|---|---|---|
| JP | 2003-167394 A | 6/2003 |
| JP | 2017-037100 A | 2/2017 |
| JP | 2023-038807 A | 3/2023 |
| JP | 2023-048849 A | 4/2023 |

\* cited by examiner

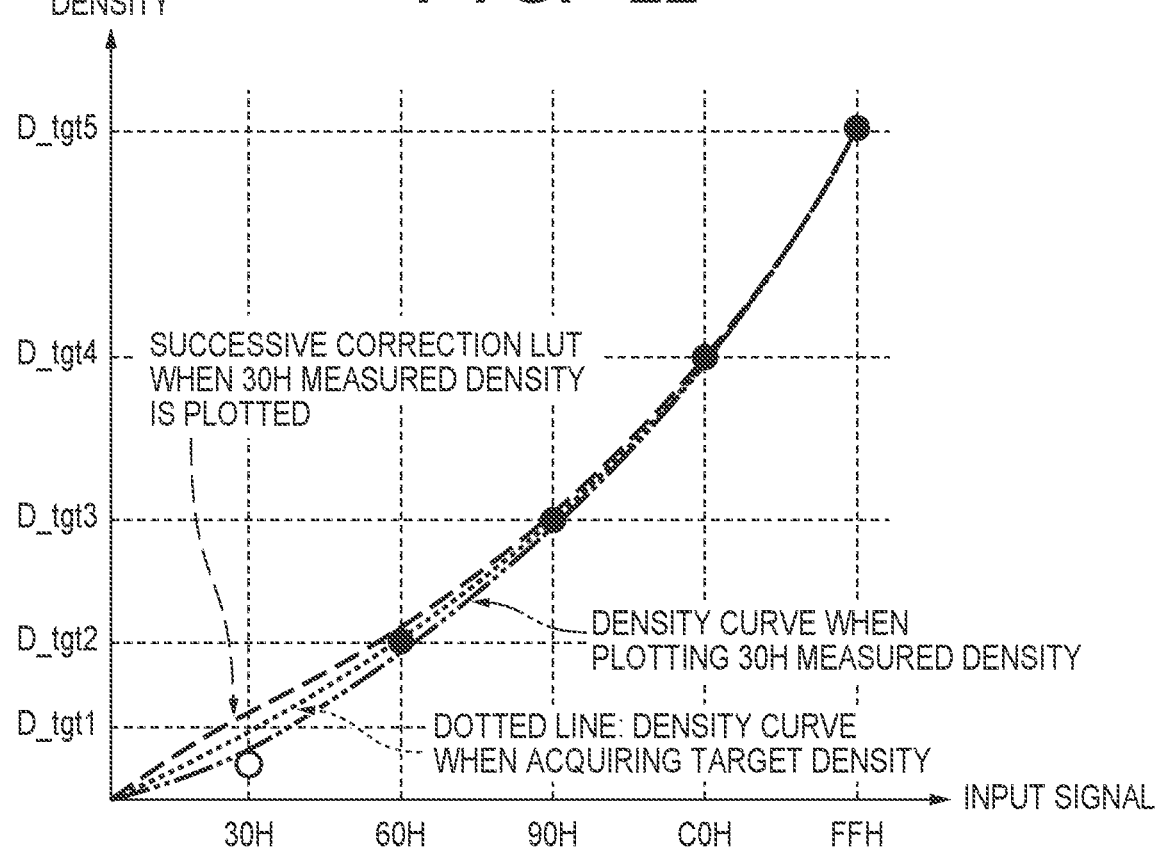

IMAGE FORMING APPARATUS DETERMINING INFORMATION RELATED TO A DENSITY OF AN IMAGE TO BE FORMED BASED ON A DETERMINATION CONDITION

BACKGROUND OF THE INVENTION

Field of the Invention

The present invention relates to an image forming apparatus, and, for example, to an image forming apparatus using an electrophotographic process.

Description of the Related Art

In an image forming apparatus, the density and density gradation characteristic of an output image may differ from a desired density and gradation characteristic due to short-term fluctuation caused by fluctuation of an environment in which the apparatus is installed or fluctuation of an environment in the apparatus, long-term fluctuation caused by aging (temporal deterioration) of a photosensitive member or a developer, or the like. Therefore, in the image forming apparatus, in order to adjust the density and gradation characteristics of the output image to a desired density and gradation characteristics, it is necessary to correct the image forming conditions as needed in consideration of these various variations.

The process of appropriately correcting the change in density or color tone in this manner is generally referred to as calibration. In the calibration, for example, some pattern images having a uniform density are formed on a sheet, a photosensitive member, an intermediate transfer member, or the like; the density of the formed pattern is measured and compared with a target value; and various conditions for forming an image are appropriately adjusted based on the comparison result.

Conventionally, in order to stabilize the density and gradation characteristics of an output image, a specific correction pattern such as a gradation pattern is formed on a sheet as disclosed in Japanese Patent Laid-Open No. 2000-238341, for example. The formed pattern is read by the image reading unit, and the read result (read data) of the gradation pattern by the image reading unit is fed back to the image forming conditions such as $\gamma$ (gamma) correction, thereby improving the stability of the image quality.

In addition, regarding when calibration is required, it is necessary to correct the gradation characteristics as appropriate in various situations, including cases of environment variation as described above or where the apparatus is left standing for a long time. For example, it is necessary to correct the gradation characteristics when environmental variation is particularly liable to occur such as when the power is turned on or when the apparatus returns from a power saving mode first thing in the morning, and in a case where the toner replenishment amount is large due to an output image duty being high, or conversely, when jobs having a low output image duty have been performed continuously. As a technique for performing such calibration, for example, a method such as Japanese Patent Laid-Open No. 2003-167394 has been proposed. Japanese Patent Laid-Open No. 2003-167394 uses a method in which a density patch image of each color is formed on an intermediate transfer member or a transfer belt, the density patch images are read by a density detection sensor, and detection results are fed back into the conditions for charging the intermediate transfer member and image processing conditions to thereby adjust the halftone gradation characteristics and the maximum density of each color.

In recent years, there has been an increasing demand for improving, together with stability of image quality, usability, and especially productivity by reducing standby time and downtime, and there is a strong demand for being able to perform calibration control for image quality stabilization over a shorter time. As a technique to handle such demand, models have been created in which variations in external environment, image output conditions, and various sensor values are used as input values, and variations in patches for calibration are predicted from the model, as in Japanese Patent Laid-Open No. 2017-37100, for example. In this way, there have been proposed techniques for omitting the process of forming an image of the patches, which consumes much of the time in calibration.

Furthermore, as a method of performing control such that an optimum operation value is obtained depending on a usage environment and a usage situation in a model for predicting variation, a technique such as that disclosed in Japanese Patent Laid-Open No. H5-72859 has been proposed. Japanese Patent Laid-Open No. H5-72859 proposes a technique of learning the characteristics of an image forming apparatus using a neural network and determining an operation amount from a state prediction value and a target value.

However, in the calibration method for predicting the variation of the color tone and the density by using a model as described above, the following problem occurs.

When calibration control for density adjustment is performed using an optimal density prediction model corresponding to a usage environment, output conditions, and usage conditions individually, it is necessary to correct the current prediction model. This is because it is typically common to, at an initial stage, use an average model that can cover certain usage environments and situations, which is not always optimal for an individual usage environment.

In order to correct the prediction model, data that combines actual density fluctuation with environmental conditions, output conditions, and the like becomes necessary. Therefore, typically, control to perform density adjustment by actually forming a patch for calibration is used in conjunction therewith, and when performing calibration control with patches, data for correcting the prediction model is simultaneously obtained.

However, if the cause of internal disturbance/external disturbance of the image forming apparatus occurs at a timing at which correction data for correcting the prediction model is obtained, or at which the prediction model is actually updated or switched, the difference between the predicted density and the actual density may be worse after the model is corrected than before the model is corrected. Examples of internal disturbance include replacement of a part of the image forming apparatus, change in image forming conditions, and the like. Examples of external disturbance factors include rapid changes in the temperature and humidity environment, and the like.

SUMMARY OF THE INVENTION

From the viewpoint of quality assurance, it is important to correct the prediction model after confirming that the prediction accuracy will be reliably maintained in terms of the characteristics for which a prediction model is corrected for each image forming apparatus.

The present invention has the following configuration. According to an aspect of the present invention, an image forming apparatus includes an image forming unit configured to form an image based on an image forming condition; and a controller configured to determine, based on a determination condition, information related to a density of an image to be formed by the image forming unit; generate the image forming condition based on the information; acquire measurement data related to a test image formed by the image forming unit, the measurement data being outputted from a sensor; determine, based on a first determination condition, first information related to a density of the test image; determine, based on a second determination condition, second information related to a density of the test image; and based on the first information, the second information, and the measurement data, select the determination condition from among a plurality of determination conditions including the first determination condition and the second determination condition.

Further features of the present invention will become apparent from the following description of exemplary embodiments with reference to the attached drawings.

BRIEF DESCRIPTION OF THE DRAWINGS

FIG. 22 is a view illustrating a relationship of each LUT at a time of actual measurement control in embodiments.

DESCRIPTION OF THE EMBODIMENTS

Figure 1:
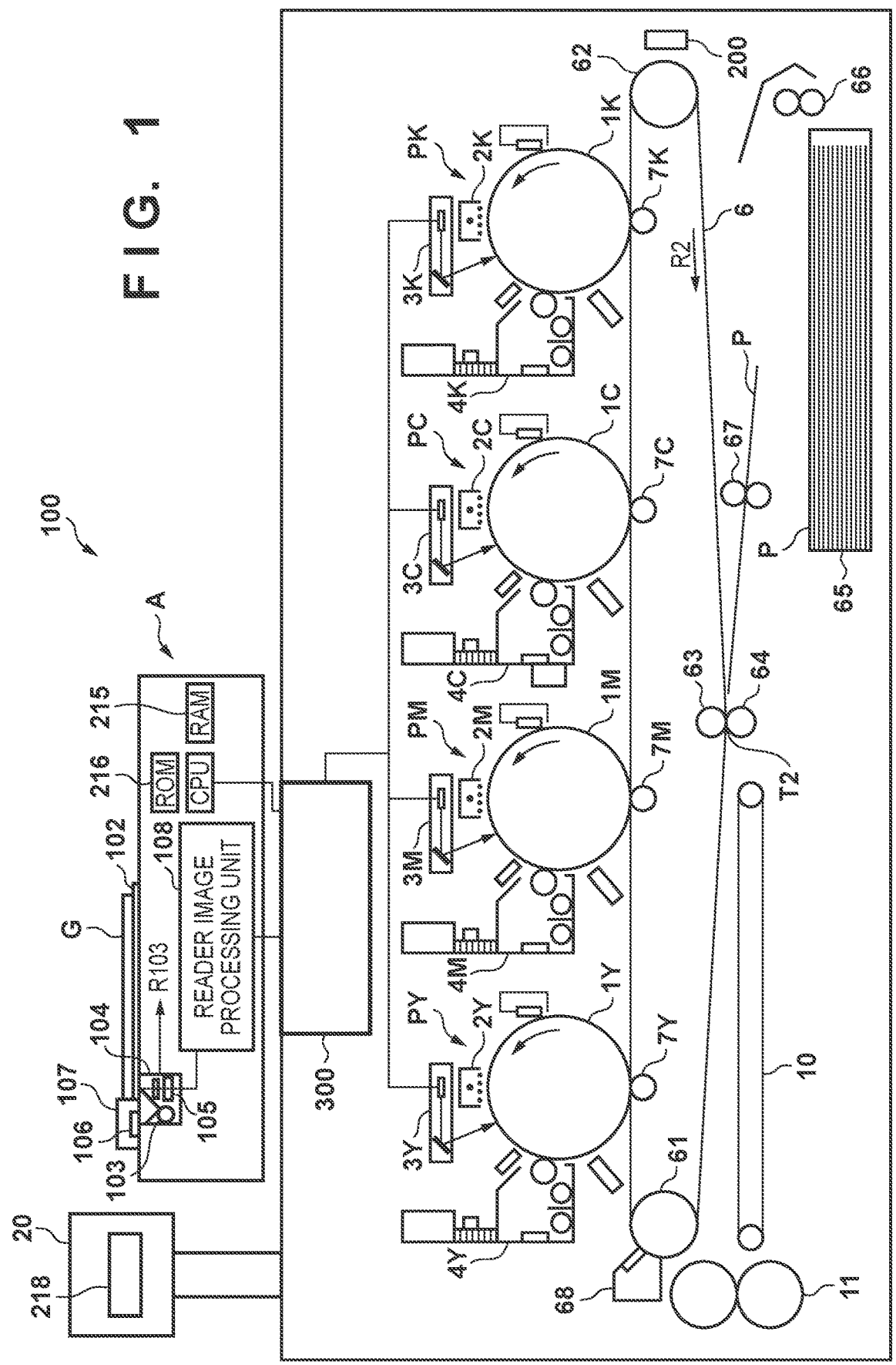
FIG. 1 is an overall schematic configuration diagram of an image forming apparatus in an embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

Embodiment 1

First, a first embodiment of the present invention will be described. In the present embodiment, a method for solving the above-mentioned problem using an electrophotographic (or electrophotographic process) image forming apparatus will be described. An electrophotographic method will be described, but the same problem exists for inkjet printers, dye sublimation printers, or the like; the characteristics of control, particularly the matter described in the claims are the same, and the problem that the invention addresses can be solved by using the method described hereinafter. Therefore, the claimed invention also encompasses such image forming apparatuses.

(Image Forming Apparatus)
(Reader Unit)

As shown in FIG. 1, an image forming apparatus 100 includes a reader unit A. An original placed on an original platen glass 102 of the reader unit A is illuminated by a light source 103, and light reflected from the original passes through an optical system 104 and is imaged in a charge-coupled device (CCD) sensor 105. The CCD sensor 105 consists of CCD line sensors arranged in three rows for red, green, and blue, and generates red, green, and blue color component signals for the respective line sensors. These reading optical system units are moved in the direction of an arrow R103 shown in FIG. 1, and convert an image of the original into an electric signal for each line. A positioning member 107 for abutting one side of the original to prevent the original from being arranged diagonally and a reference white plate 106 for determining a white level of the CCD sensor 105 to perform shading correction of an image captured by the CCD sensor 105 are arranged on the original platen glass 102. An image signal obtained by the CCD sensor 105 is subjected to A/D conversion by a reader image processing unit 108, shading correction using a read signal of the reference white plate 106, and color conversion, and then is sent to a printer unit, and is processed by a printer control unit. The reader unit A is connected to an operation unit 20 for an operator to perform operations such as an operation to start a copy or to perform various settings and is connected to a display device 218. The reader unit A may be provided with a CPU for performing other control, a RAM 215, and a ROM 216. These control the reader unit A.

(Printer Unit)

As shown in FIG. 1, the image forming apparatus 100 is a tandem intermediate transfer full color printer in which yellow, magenta, cyan, and black image forming units PY, PM, PC, and PK are arranged along an intermediate transfer belt 6 which is an intermediate transfer medium.

In the image forming unit PY, a yellow toner image is formed on a photosensitive drum 1Y and is primary-transferred to the intermediate transfer belt 6. In the image forming unit PM, a magenta toner image is formed on a photosensitive drum 1M and is primary-transferred to the intermediate transfer belt 6 so as to overlap the yellow toner image. In the image forming units PC and PK, a cyan toner image and a black toner image are formed on the photosensitive drums 1C and 1K, respectively, and the cyan toner image and black toner image are similarly overlappingly primary-transferred to the intermediate transfer belt 6 in sequence.

The four colors of toner images that have been primary-transferred onto the intermediate transfer belt 6 are conveyed to a secondary transfer unit T2 and are collectively secondary-transferred to a print material P. The print material P, after the four-color toner image is secondary-transferred thereto, is conveyed by a conveying belt 10, heated and pressurized by a fixing device 11 to thereby fix the toner image to its surface, and then is discharged to the outside of the device.

The intermediate transfer belt 6 is supported by a tension roller 61, a driving roller 62, and an opposing roller 63, and is driven by the driving roller 62 rotating in the direction of an arrow R2 at a predetermined process speed.

Print materials P drawn out from a print material cassette 65 are separated one by one by a separating roller 66 and fed to a resist roller 67. The resist roller 67 receives the print material P in a stopped state and stands by, and then feeds the print material P to the secondary transfer unit T2 at a timing aligned with the toner image on the intermediate transfer belt 6.

A secondary transfer roller 64 contacts the intermediate transfer belt 6 supported by the opposing roller 63 to form the secondary transfer unit T2. When a DC voltage having a positive polarity is applied to the secondary transfer roller 64, a toner image charged to a negative polarity and carried on the intermediate transfer belt 6 is secondary-transferred to the print material P.

The image forming units PY, PM, PC, and PK are configured to be substantially the same except that the colors of the toner used in developing apparatuses 4Y, 4M, 4C and 4K are yellow, magenta, cyan, and black. In the following description, subscripts Y, M, C, and K, attached to the reference numerals to indicate that the respective color are omitted when no particular distinction is required and an explanation is made collectively.

As shown in FIG. 1, a charging device 2, an exposure device 3, the developing apparatus 4, the primary transfer roller 7, and a cleaning device are arranged around the photosensitive drum 1 in the image forming unit.

In the photosensitive drum 1, a photosensitive layer that has a negative charge polarity is formed on the outer surface of an aluminum cylinder, and the photosensitive drum 1 rotates in the direction of the arrow at a predetermined processing speed. The photosensitive drum 1 is an OPC photosensitive member having a reflectance of about 40% for near-infrared light (960 nm). However, the photosensitive drum 1 may be an amorphous silicon-based photosensitive member or the like having about the same reflectivity.

The charging device 2 uses a scorotron charger, and irradiates the photosensitive drum 1 with charged particles accompanying a corona discharge to charge the surface of the photosensitive drum 1 to a uniform negative potential. The scorotron charger has a wire to which a high voltage is applied, a shield unit connected to ground, and a grid unit to which a desired voltage is applied. A predetermined charging bias is applied to the wire of the charging device 2 from a charge bias power source (not shown). A predetermined grid bias is applied to the grid unit of the charging device 2 from a grid bias power source (not shown). Although it also depends on the voltage applied to the wire, the photosensitive drum 1 is charged substantially to the voltage applied to the grid unit.

The exposure apparatus 3 scans a laser beam with a rotary mirror and writes an electrostatic image of an image on the surface of the charged photosensitive drum 1. A potential sensor (not shown), which is an example of a potential detection means, can detect the potential of an electrostatic image formed by the exposure apparatus 3 on the photosensitive drum 1. The developing device 4 develops toner into the toner image by attaching the toner to the electrostatic image of the photosensitive drum 1.

The primary transfer roller 7 presses the inner surface of the intermediate transfer belt 6 to form a primary transfer unit T1 between the photosensitive drum 1 and the intermediate transfer belt 6. DC voltage of a positive polarity is applied to the primary transfer roller 7, whereby the negative polarity toner image carried on the photosensitive drum 1 is primary-transferred onto the intermediate transfer belt 6 passing through the primary transfer unit T1.

An image density sensor (patch detection sensor) 200 is disposed so as to face the intermediate transfer belt, and measures the image density of unfixed toner. In the present embodiment, the image density sensor is configured so as to be disposed to face the intermediate transfer belt, but it is also possible for it to be configured to be disposed as appropriate so as to face the photosensitive drum. The image density sensor disposed above the photosensitive drum, the intermediate transfer belt, or the like is a sensor for measuring the image density of unfixed toner. It is also possible to arrange, downstream of a fixing device, an image density sensor for measuring a fixed pattern image, and the invention is not limited to the image density sensor described in this embodiment.

The cleaning device causes a cleaning blade to rub against the photosensitive drum 1 to recover residual toner which failed to be transferred to the intermediate transfer belt 6 and remains on the photosensitive drum 1.

A belt cleaning apparatus 68 causes a cleaning blade to rub against the intermediate transfer belt 6, and collects residual toner that has failed to be transferred to the print material P, has passed through the secondary transfer unit T2, and has remained on the intermediate transfer belt 6.

Note, the photosensitive drum 1 of each color component may be provided with a potential sensor for measuring the potential on the surface thereof, and may be configured to output a signal indicating the potential.

(Image Processing Unit)

Figure 2:
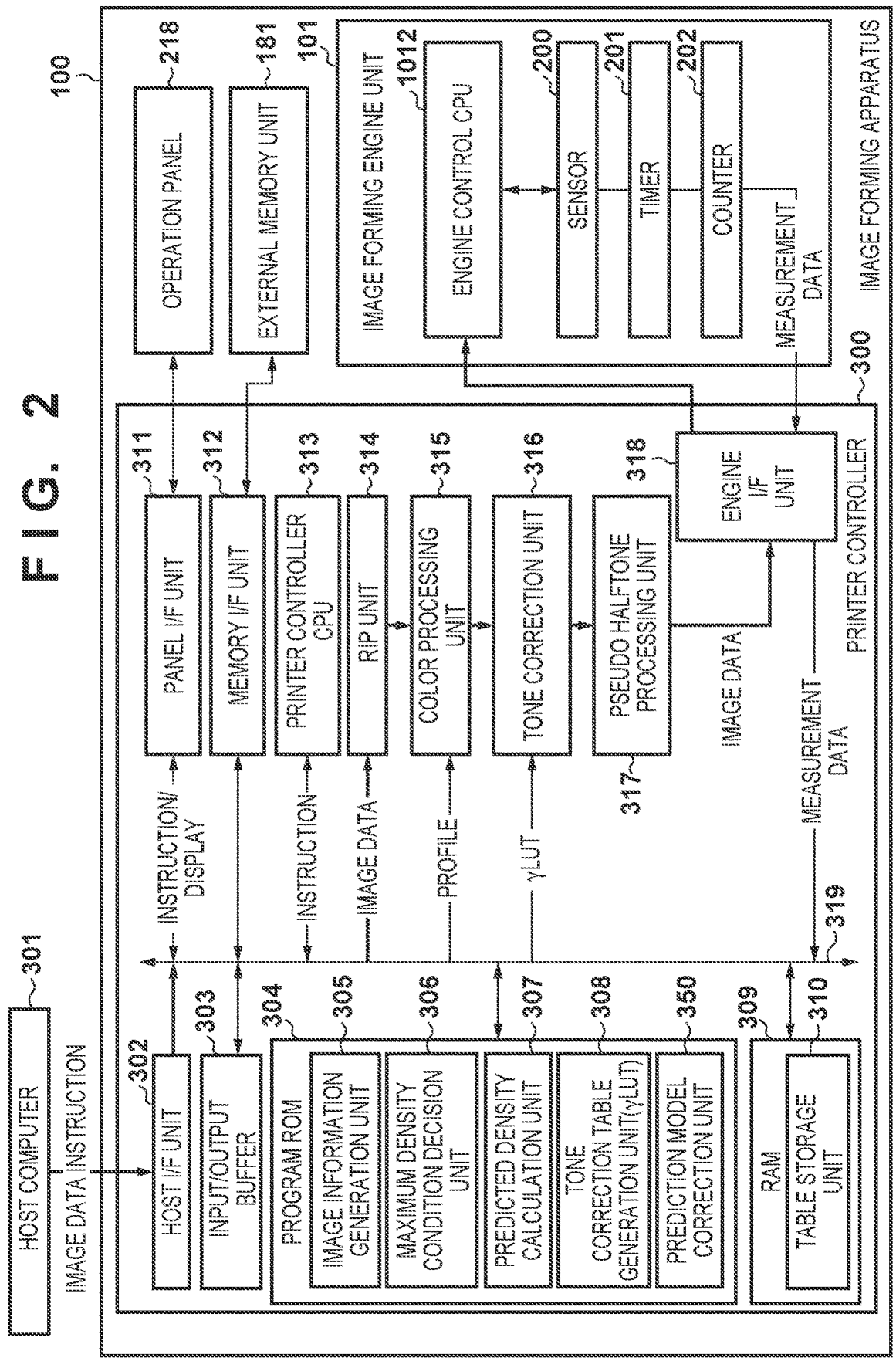
FIG. 2 is a printing system configuration diagram.

FIG. 2 is a diagram showing a configuration of a printing system according to the present invention. In the figure, reference numeral 301 denotes a host computer, and reference numeral 100 denotes an image forming apparatus. The host computer 301 and the image forming apparatus 100 are connected by a communication line such as USB 2.0 High-Speed, 1000Base-T/100Base-TX/10Base-T (conforms to IEEE 802.3).

In the image forming apparatus 100, a printer controller 300 controls overall operation of the printer. The printer controller 300 has the following configuration.

A host I/F unit 302 manages input and output to and from the host computer 301.

An input/output buffer 303 transmits and receives control codes from the host I/F unit 302 and data from various communication means.

A printer controller CPU 313 controls overall operation of the controller 300.

A program ROM 304 contains control programs and control data for the printer controller CPU 313.

A RAM 309 is used as a work memory for calculation necessary to interpret the above-described control codes and data and for printing, and for processing print data.

An image information generation unit 305 generates various image objects according to settings in data received from the host computer 301.

An RIP (Raster Image Processor) unit 314 expands an image object into a bitmap image.

A color processing unit 315 performs multi-order color conversion processing.

A gradation correction unit 316 executes single color gradation correction.

A pseudo halftone processing unit 317 performs dither matrix or error diffusion pseudo halftone processing or the like.

An engine I/F unit 318 transfers the converted image to an image forming engine unit.

An image forming engine unit 101 forms the converted image data as an image.

The flow of the image processing of the printer controller at the time of basic image formation is indicated by thick solid lines.

The printer controller 300 performs not only image formation but also various control calculations. A control program for this purpose is contained in the program ROM 304. The control program and data include the following.

A maximum density condition decision unit 306 performs a maximum density adjustment.

A predicted density calculation unit 307 predicts the density based on an output value from a sensor or the like.

A gradation correction table generation unit (γLUT) 308 performs density gradation correction. The generated gradation correction table includes, for example, an output density value corresponding to an input density value as a correction value.

A prediction model correction unit 350 corrects a model for calculating a predicted density.

A detailed description of various control operations in the printer controller will be given later.

The gradation correction table may be referred to as an image correction condition. Also, since prediction is to perform a given operation based on a given parameter to determine a target value, the prediction may be referred to as a determination. Values acquired by prediction may be referred to as prediction results or determination results.

In addition, there is a table storage unit 310 for primary storage of adjustment results from the above-described maximum density condition decision unit 306, predicted density calculation unit 307, and gradation correction table generation unit 308. Further, there is the operation panel 218 which is for operating the printing apparatus and making instructions to execute the above-described correction process, and a panel I/F unit 311 which connects the printer controller 300 and the operation panel 218. Further, there is an external memory unit 181 used for storing print data and various information of the printing apparatus, and the like, a memory I/F unit 312 which connects the controller 300 and the external memory unit 181, and a system bus 319 which connects the respective units.

The image forming apparatus 100 further includes an image forming engine unit 101, which is controlled by an engine control CPU 1012. In addition, the image forming engine unit 101 includes a first density sensor 200, a second density sensor 500, a timer 201, a counter 202, and the like.

(Density Prediction Unit)

Figure 3:
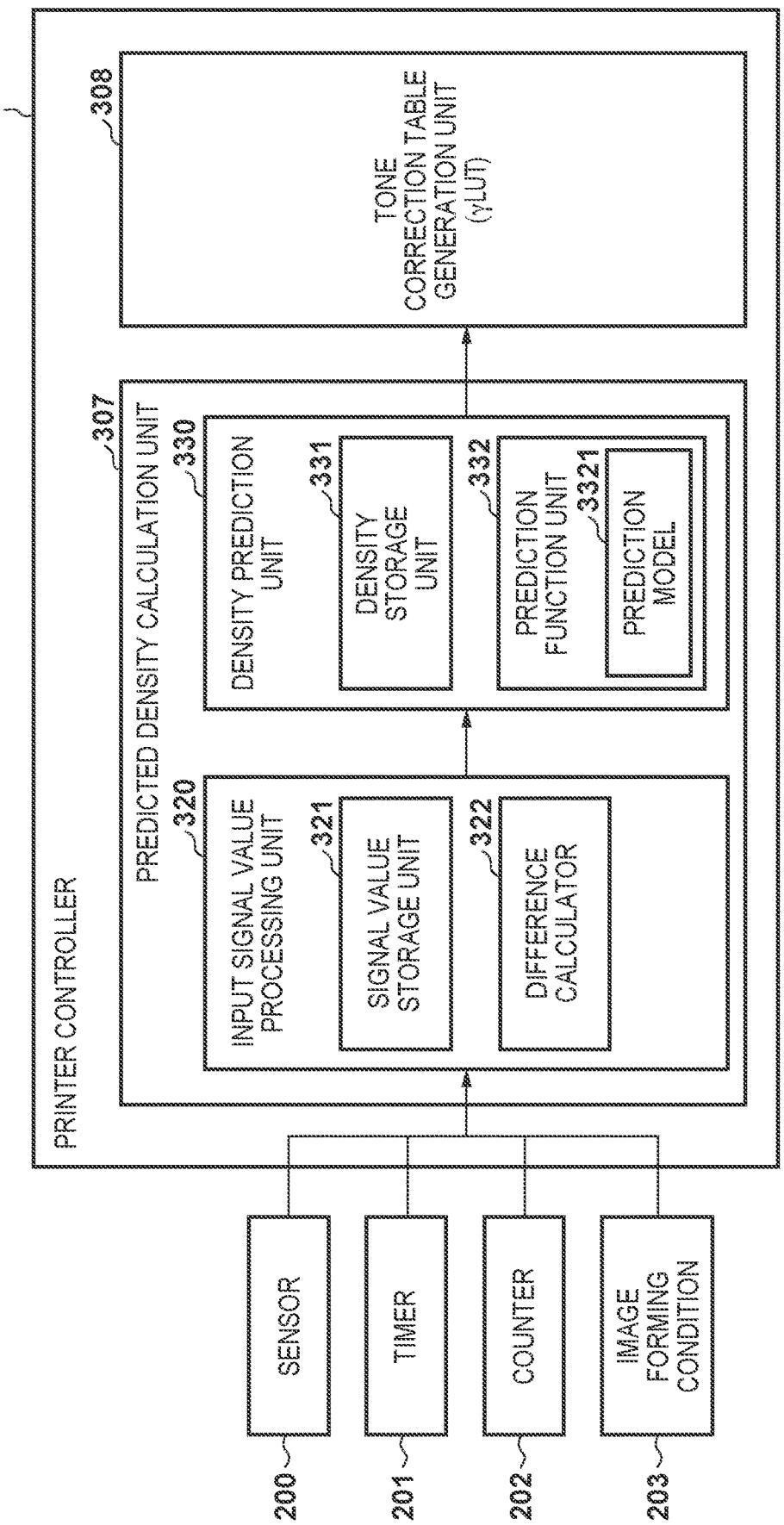
FIG. 3 is a block diagram of a density prediction unit according to the present invention.

Next, a predicted density calculation unit in the printer controller 300 will be described with reference to FIG. 3. Various signal values from the image density sensor 200, the timer 201, and the counter 202 of the image forming apparatus 100 and current image forming conditions 203 are inputted into a predicted density calculation unit 307 in the printer controller 300. The image forming conditions 203 include, for example, current exposure intensity (hereinafter referred to as LPW) and charging potential (hereinafter referred to as Vd) in the image forming apparatus 100 and the like. In addition, the temperature and the like in the device may be included. At this time, first, the signal value is inputted to an input signal value processing unit 320 in the predicted density calculation unit 307. The input signal value processing unit 320 includes a signal value storage unit 321 for storing a base signal value, and a difference calculation unit 322 for calculating a difference between the inputted signal value and the signal value stored in the signal value storage unit 321.

The signal value processed by the input signal value processing unit 320 is inputted to a density prediction unit 330. The density prediction unit 330 includes a density storage unit 331 that stores a base density, and a prediction function unit 332 that predicts a density from an input value from the input signal value processing unit 320. The prediction function unit 332 includes an image density prediction model (also referred to as the prediction model) 3321 for calculating from an input value a density change amount from a base density. The calculated density change amount and the base density stored in the density storage unit 331 are added to calculate the current predicted density. The image density prediction model 3321 will be described later. Further, acquisition of the base signal value and acquisition of the base density will be described later.

The calculated predicted density is inputted to the gradation correction table generation unit 308. The gradation correction table generation unit 308 generates a γLUT for input to the gradation correction unit 316 based on the predicted density. Note, the gradation correction method will be described later.

(Prediction Model Correction Unit)

Figure 4:
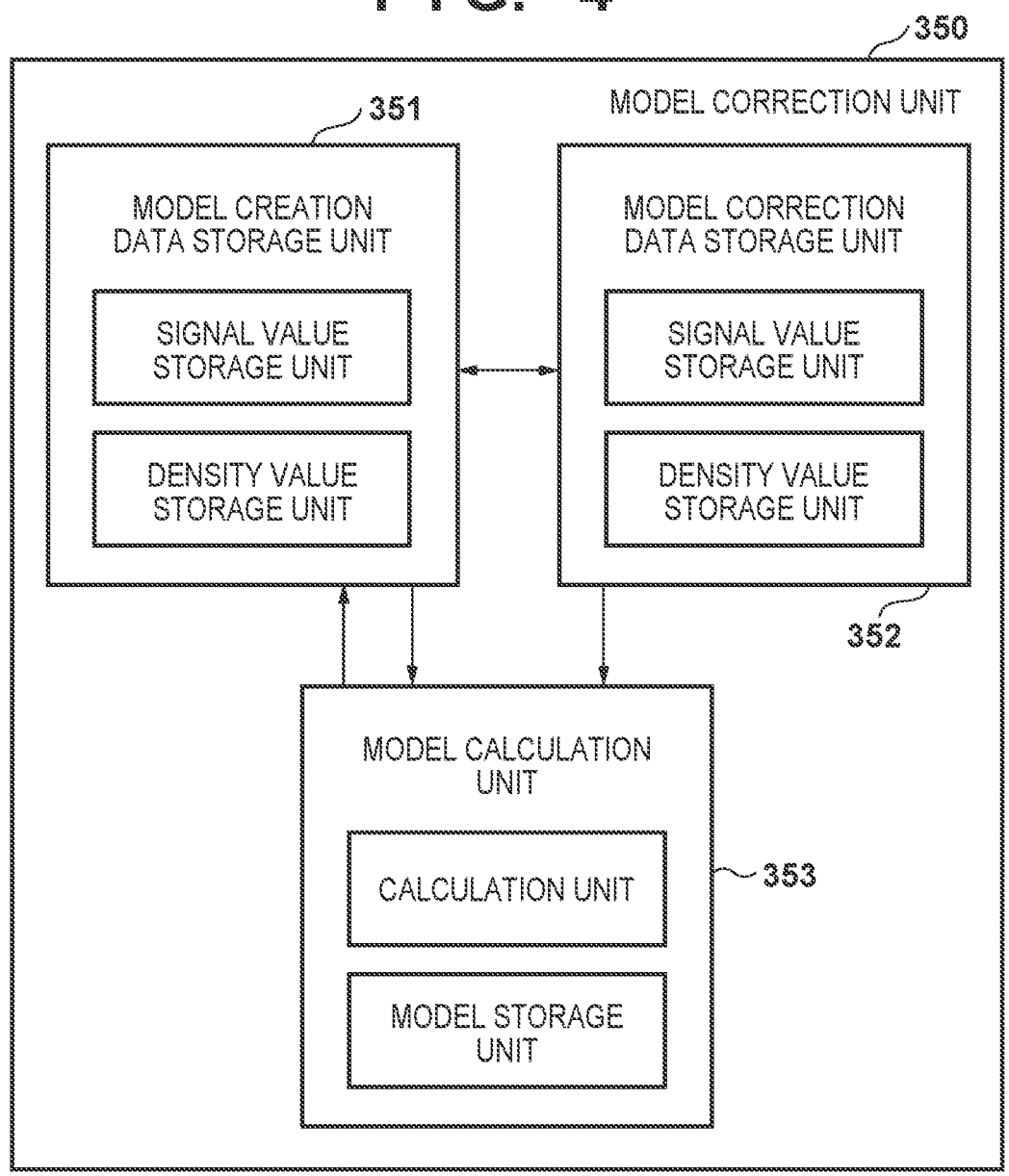
FIG. 4 is a block diagram of a prediction model correction unit according to the present invention.

Next, the prediction model correction unit 350 for correcting the model for calculating the predicted density will be described with reference to FIG. 4. Correction of the prediction model is performed by adding correction data to the data for which the current model is created, as will be described later. That is, the corrected model is created by adding correction data. Therefore, the model creation data storage unit 351 that stores data when the current model is created includes a signal value storage unit that stores signal values such as sensors and conditions for creating a model, and a density value storage unit that is paired with the signal value storage unit. It should be noted that the current model refers to a base model (or initial model) that has been initially created in a state where no correction has been made, and to a latest corrected model in a state where a correction has been made.

A model correction data storage unit 352 stores newly acquired correction data. The model correction data storage unit 352 also includes a signal value storage unit for storing a signal value, and a density value storage unit for storing a density value paired with the stored signal value.

Furthermore, the model calculation unit 353 for determining a new model using these data includes a calculation unit for creating a new model and a model storage unit for storing the created model. When the model correction is completed, the relationship between the signal value and the density value is stored in the model creation data storage unit as a data set. The prediction model correction unit 350 described here can be realized by being included in an image forming apparatus or by being included in an apparatus connected to an image forming apparatus via a network.

(Base Signal Values and Base Densities Acquisition)

Figure 5:
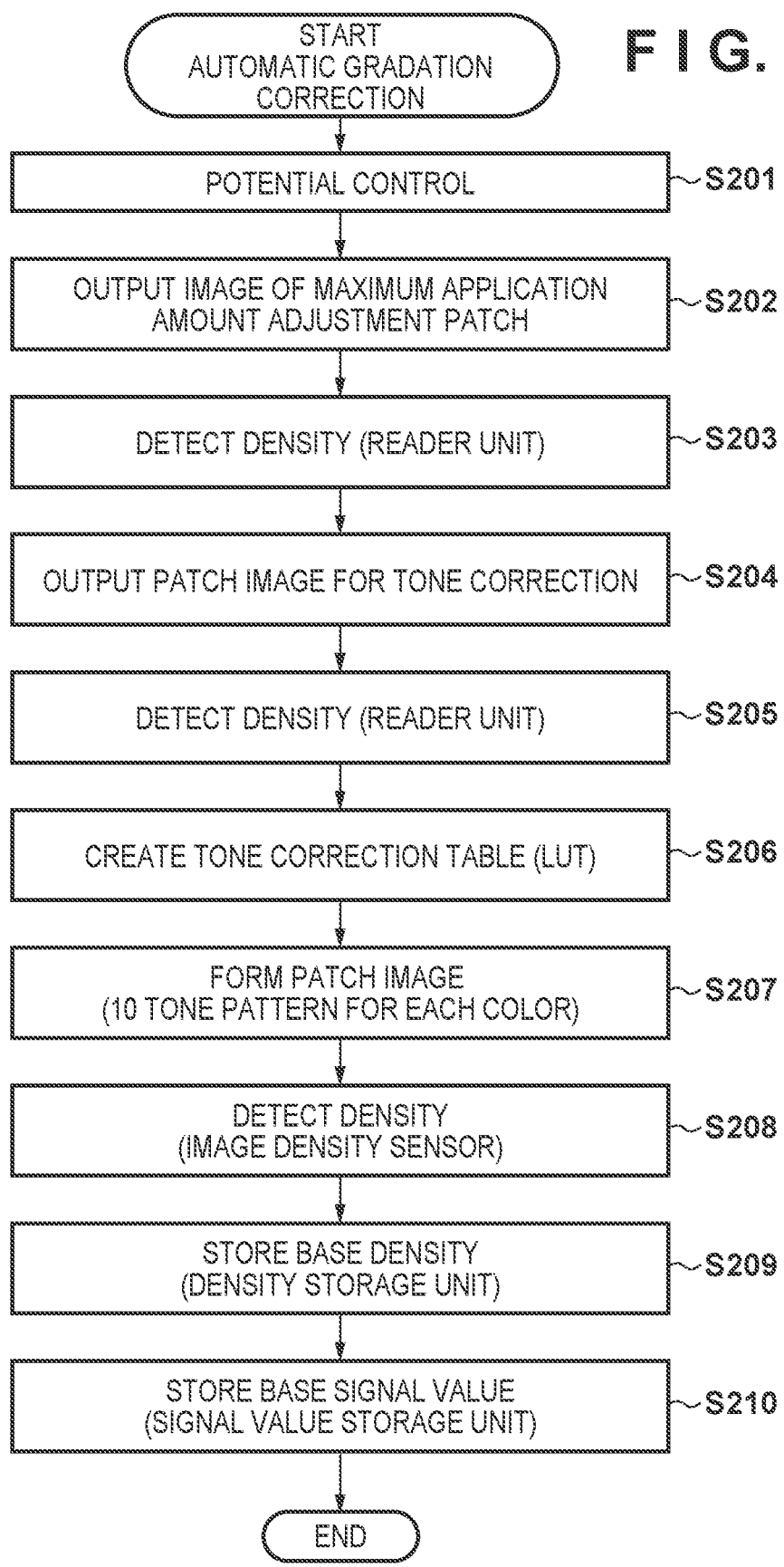
FIG. 5 is a view illustrating a flow when the automatic gradation correction is executed in embodiments.

Next, a method for acquiring base signal values stored in the signal value storage unit 321 and base densities stored in the density storage unit 331, which are described above for the density prediction unit 330, will be described. As an example, the base density used in the present embodiment is acquired by automatic gradation correction using an output image formed on a sheet (a toner image after fixing), which is periodically performed as shown in FIG. 5. In the present embodiment, a system having a potential sensor for measuring the potential on the drum surface is described, but the present invention is not limited thereto.

(Potential Control)

When the automatic gradation correction control is started freely by a user, firstly, potential control processing (step S201) starts. The engine control CPU 1012 determines a target charging potential (VdT), a grid bias (Y), and a development bias (Vdc) by potential control prior to printing on sheets (media, e.g., paper). By the potential control processing, it is possible to determine a charging potential or the like in accordance with environmental conditions in which the image forming apparatus 100 is installed (including conditions of temperature and humidity). The engine control CPU 1012 may be referred to as an engine control unit 1012.

Figure 6:
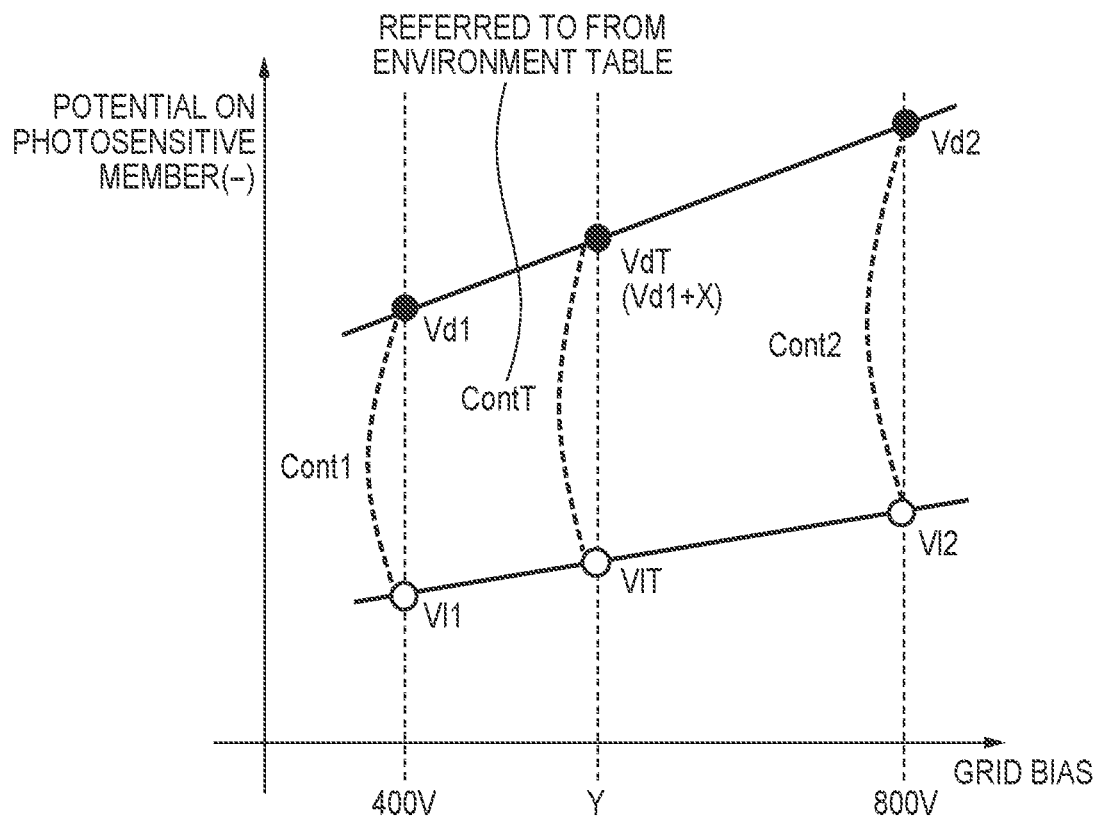
FIG. 6 is a conceptual explanatory diagram of two-point potential control in embodiments.

In the present embodiment, the engine control CPU 1012 performs potential control called two-point potential control. FIG. 6 is a diagram illustrating the concept of two-point potential control. In FIG. 6, the horizontal axis represents the grid bias, and the vertical axis represents the photosensitive member surface potential. Vd1 represents the charging potential under a first charging condition (grid bias 400V), and Vl1 represents the potential of an exposure unit formed by a standard laser power. Vd2 represents the charging potential under a second charging condition (grid bias 800V), and Vl2 is the potential of the exposure unit formed by a standard laser power at that time. Contrast potentials (Cont1, Cont2) at the grid biases of 400V and 800V can be calculated with equations (1) and (2).

$$(Cont1)=(Vd1-Vl1) \quad (1)$$

$$(Cont2)=(Vd2-Vl2) \quad (2)$$

Here, the increase (ContΔ) in contrast potential for every 1V of charging potential can be calculated by equation (3) based on the results of equations (1) and (2).

$$(ContΔ)=((Cont2-Cont1)/(Vd2-Vd1)) \quad (3)$$

Meanwhile, an environment sensor (not shown) is provided in the image forming apparatus 100, and the environment sensor measures environmental conditions of the temperature and humidity in the image forming apparatus 100. The engine control CPU 1012 obtains the environmental conditions (for example, an absolute moisture amount) in the image forming apparatus 100 based on the measurement result of the environmental sensor. Then, a target contrast potential (ContT) corresponding to the environmental condition is referred to from an environment table registered in advance.

The relationship between the target contrast potential (ContT) and the increase in contrast potential (ContΔ) can be calculated with equation (4).

$$ContT=Cont1+X \cdot ContΔ \quad (4)$$

When a parameter "X" satisfying the relationship of equation (4) is calculated, the target charging potential (VdT) (hereinafter, also referred to as "target potential") can be calculated with equation (5).

$$VdT=Vd1+X \quad (5)$$

The charging potential change amount (VdΔ) per 1V of grid bias can be calculated with equation (6).

$$(VdΔ)=(Vd2-Vd1)/(800-400) \quad (6)$$

The grid bias (Y) for applying the target potential (VdT) can be calculated from equation (7).

$$\text{Target } VdT=400+Y \cdot VdΔ \quad (7)$$

In equation (7), VdΔ can be calculated with equation (6), and VdT can be calculated with equation (5). Therefore, the grid bias (Y) satisfying the relationship of equation (7) can be finally determined by substituting potentials known from equations (5) and (6).

Through the above processing, it is possible to determine the target potential (VdT) and the grid bias (Y) according to the environmental conditions. The development bias (Vdc) has a specified potential difference with respect to the target potential (VdT), and can be calculated by subtracting the specified potential from the determined target potential (VdT).

At the determined development bias (Vdc), subsequent image formation is performed. The potential on each drum is negative, but the negative is omitted here in order to make the calculation process easier to understand.

With the above processing, the potential control processing of step S201 of FIG. 5 is completed.

(Maximum Toner Application Amount Adjustment)

Next, the process proceeds to step S202, and a patch image for adjusting a maximum toner application amount is formed (step S202) using the grid bias (Y) determined by the potential control in the preceding step S201 and the developing bias (Vdc).

In a printer that prioritizes productivity, the flow described below is omitted, and the flow may adjust the maximum application amount only by the potential control. However, since the color material charge retention amount in the developer, the ratio at which the toner and the carrier are mixed, and the like also change depending on the environment and durability, potential control alone is of low accuracy. Therefore, in the present embodiment, a patch image for which exposure intensity (hereinafter referred to as LPW) is changed in several stages is formed, and an LPW to be used for normal image formation is determined.

Figure 7:
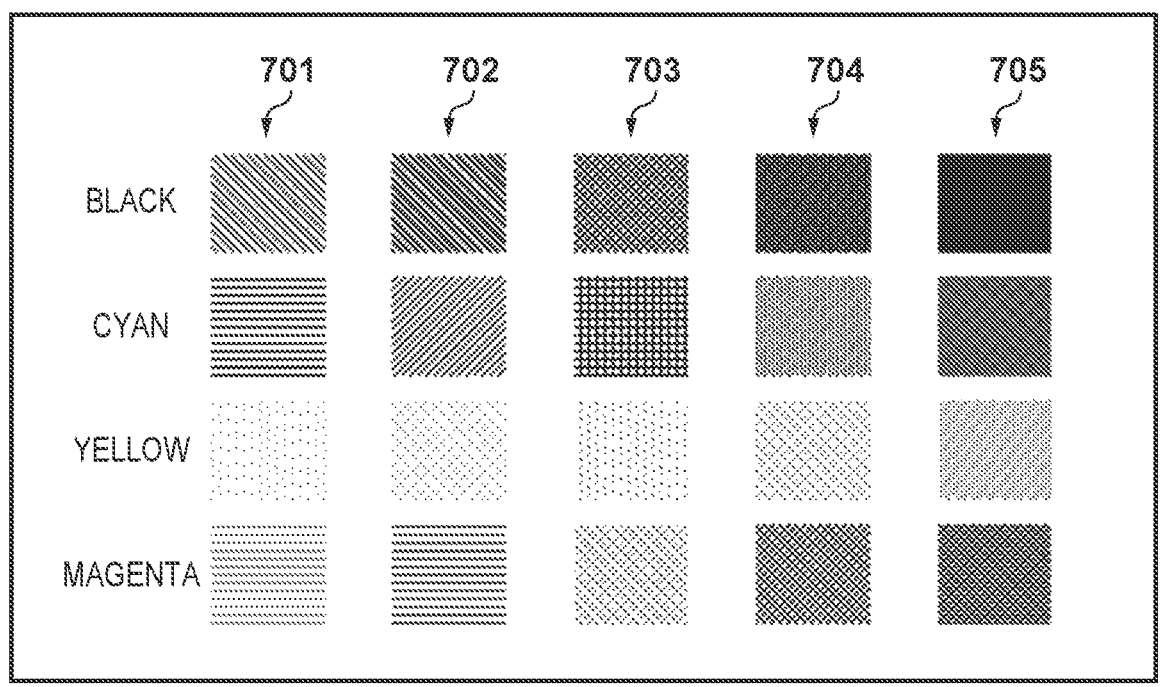
FIG. 7 is a view illustrating one example of a maximum toner application amount correction chart in embodiments.

The image forming apparatus 100 in which the grid bias (Y) and the development bias (Vdc) are determined forms five patch images 701 to 705 for each color (black, cyan, yellow, magenta) as shown in FIG. 7, in order to adjust the maximum application amount. The number of patches is not limited to this. The conditions for forming the five patch images are each different in LPW, and are LPW1, LPW2, LPW3 (corresponding to the standard laser power when used for potential control), LPW4, and LPW5 in order from the left. Laser power increases from LPW1 to LPW5 in order. Also, the number of colors of the patch may accord to the number of color components used in the image forming apparatus 100, and is not limited to four.

Figure 8:
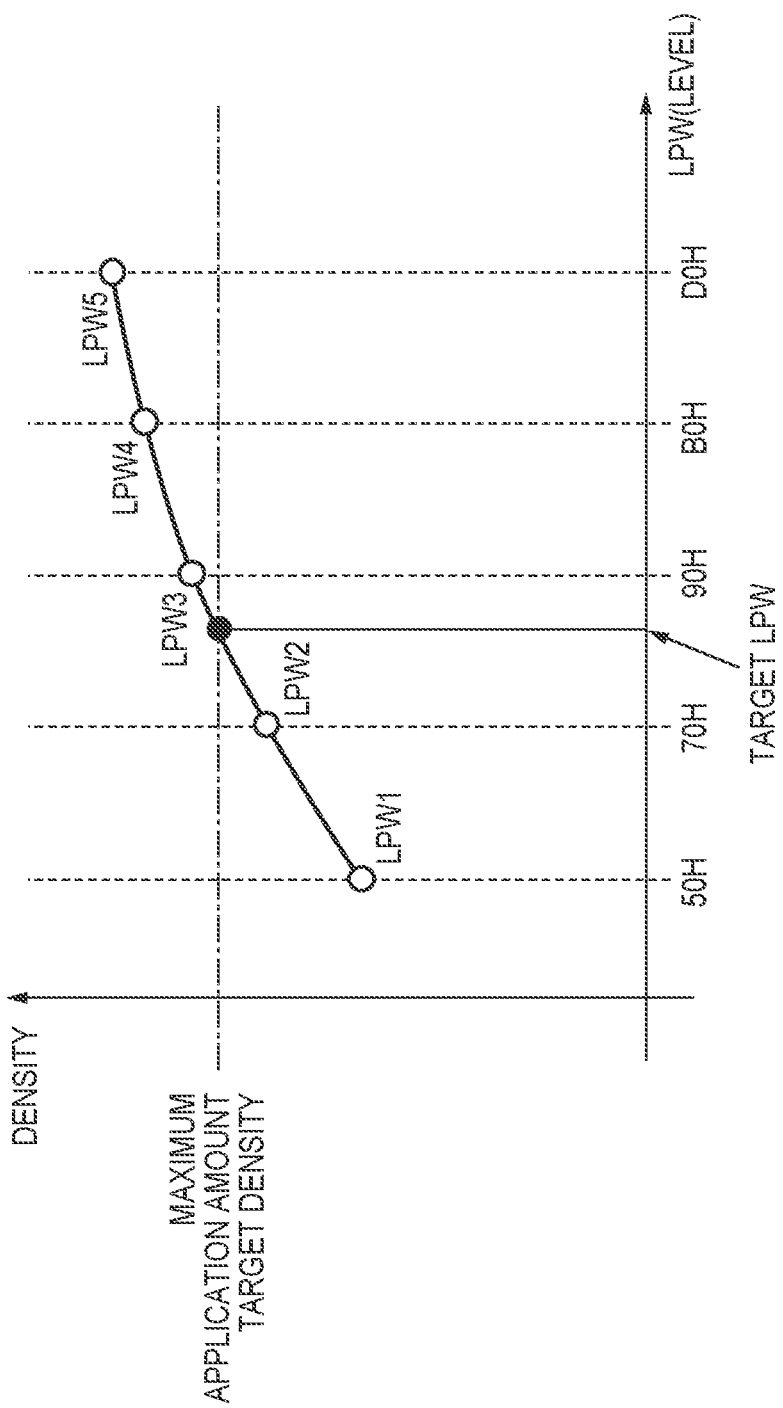
FIG. 8 is a conceptual explanatory diagram of a determination of an exposure intensity at a time of maximum toner application amount correction in embodiments.

A user sets the outputted sheet in the reader unit, and the density of the image pattern is automatically detected (step S203). FIG. 8 is a diagram showing the relationship between the density value and the LPW of each patch image. The toner application amount can be adjusted by controlling the LPW in accordance with a density target value (hereinafter, also referred to as "the maximum application amount target density value") which sets a detected density value as the target.

(Gradation Correction and Base Value Acquisition)

When the adjustment of the maximum toner application amount is completed, the gradation characteristics are corrected next. Here, using the previously determined grid bias (Y), development bias (Vdc), and LPW level, an image pattern of 64 gradations of each color is formed and outputted onto a sheet (step S204). Also, the gradation count is not limited to this.

A user sets the outputted image in the reader unit, and the density of the image pattern is automatically detected (step S205).

Figure 9:
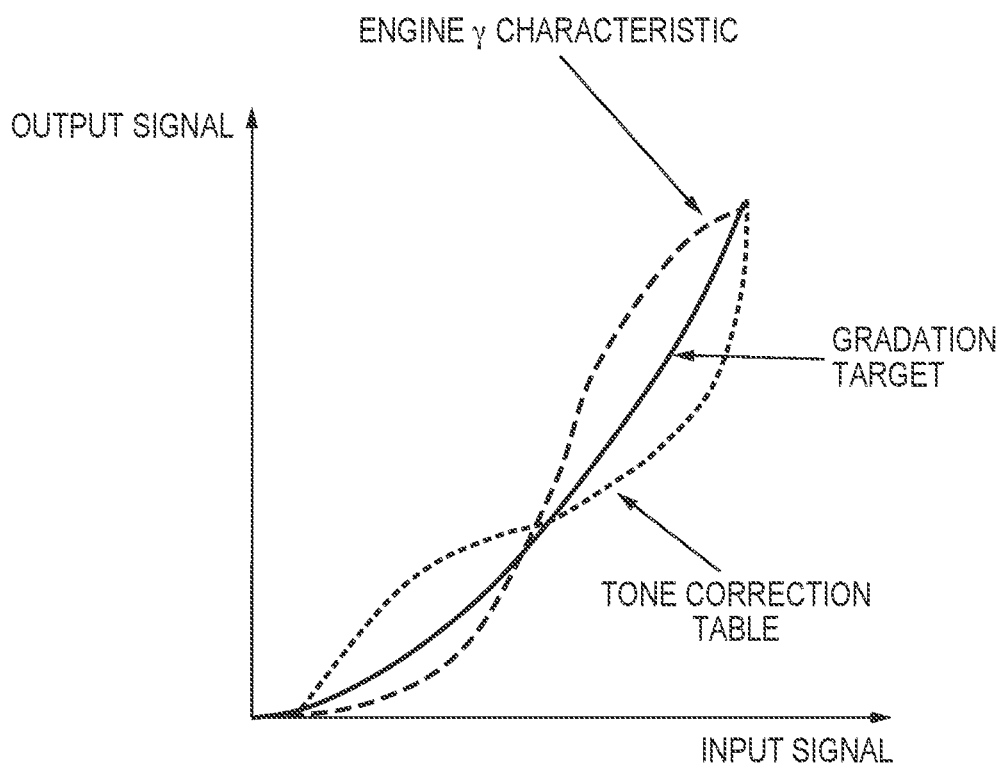
FIG. 9 is a view illustrating a gradation correction table at a time of automatic gradation correction in embodiments.

From the density obtained from the image pattern, interpolation processing and smoothing processing are performed to obtain an engine γ characteristic of the entire density region. Next, using the obtained engine γ characteristic and a preset gradation target, a gradation correction table for converting the input image signal into an image signal for output is created (step S206). In the present embodiment, as shown in FIG. 9, inverse conversion processing is performed so as to match the gradation target to create a gradation correction table.

When this work is completed, the density on the paper is matched to the gradation target over the entire density region.

The target LPW determined by the above procedure is applied, and a toner image pattern including a test image (also referred to as a measurement image) of a plurality of gradations is formed for each color component using the gradation correction table (step S207). If the density of the test image is detected on the intermediate transfer member by using the image density sensor 200 (step S208), that density value becomes the target density on the intermediate transfer member, and is stored in a density storage unit 331 as the base density (step S209). In the present embodiment, after the gradation correction table is created, a test image of 10 gradations of each color is formed, the test image is measured using the image density sensor 200, and the result (a measured value, for example) is stored as a base density in the density storage unit 331. The density storage unit 331 stores measurement results of the image density sensor 200 that vary according to the density of the test image. In this case, the data stored in the density storage unit 331 is test image density values. Note that the density values may be stored, for example, together with a density value before or after a gradation correction corresponding to that density. However, it is necessary to decide which. If test images to be formed are determined in advance, a detected density value for each test image may be stored without association with a density value. The base density value is referenced during calibration.

Further, output values of sensors, counter values, and timer values, and the image forming conditions such as the grid bias, the developing bias, and the LPW level when the base density is acquired by performing the automatic gradation correction are stored as the base signal values in a signal value storage unit 321 (step S210). Referring to the base density, the engine γ characteristic, and the base signal values thus obtained, the gradation correction table (LUT) is updated as described below.

Note that since the image density prediction model is assumed to be a model for predicting density of a test image such as a patch on an intermediate transfer member in the present embodiment, density values measured on the intermediate transfer member is stored as base density values. However, in the case of a model for predicting density of a test image on a printing medium, for example, a density of a test image on a storage medium is measured by the reader unit A as the base density value (base density value) and stored. The base density may be appropriately selected depending on the position of the patch density being handled, and the image density prediction model is not limited to the above. Note that a density sensor provided on the sheet conveying path may be used instead of the reader unit A.

(Density Correction Control)
(Overview of Control Timing of Actual Measurement Control and Prediction Control)

In the procedure of FIG. 5, a base gradation correction table is prepared, and a base density and a base signal value are stored. The gradation correction table needs to be updated in accordance with a change in color tone or a change in density that occurs in accordance with the degree of use of the image forming apparatus. For this reason, in the present embodiment, density correction by actual measurement control and density correction by prediction control are used in combination.

Execution of a density correction sequence according to actual measurement control in which a density patch is formed on the intermediate transfer belt and the density patch is read by an image density sensor such as a density sensor often interrupts an image formation sequence (typically a print operation), which is one cause of lower productivity. Meanwhile, executing actual measurement control at a lower frequency in consideration of lower productivity leads to worse image quality because it neglects variation in color tone and/or density. Accordingly, the control timing of the actual measurement control is set in consideration of a balance in color tone/density variation and productivity in conventional image forming apparatuses. Although it may be possible, depending on the configuration of the main body, to improve the frequency of the measurement control by forming a density patch outside the image forming range, it is difficult to increase the frequency of the measurement control because performing the measurement control at a high frequency may lead to an increase in the amount of toner used, that is, an increase in cost.

However, by executing density prediction control, it is possible to compensate the density correction between actual measurements and suppress color tone and density variation. For example, a density correction according to actual measurement control is performed periodically (for example, at a second frequency) and also prediction control density correction is performed at a higher frequency (for example, at a first frequency) than the density correction according to the actual measurement control. In this way, it is possible to realize a greater suppression of color tone fluctuation since the density correction can be performed at a higher frequency. Also, since prediction control does not accompany test image formation and reading, productivity does not suffer.

(Method for Generating (Updating) a LUT at the Time of Predicted Density Correction)

Next, a method of reflecting the calculated density values into the LUT in the prediction control will be described. First, at the time of the automatic gradation correction performed arbitrarily by the user (FIG. 5), a gradation correction table (hereinafter referred to as the base correction LUT) is formed in accordance with the engine γ characteristic for gradation targets (hereinafter referred to as the gradation LUT) set in advance. Thereafter, the base density value for 10 gradations of each of the colors described above is acquired. After automatic gradation correction, input image data is subjected to conversion by this initial correction LUT and inputted into the engine, adjusted to the engine γ characteristic and output to become a target gradation LUT.

Figure 10:
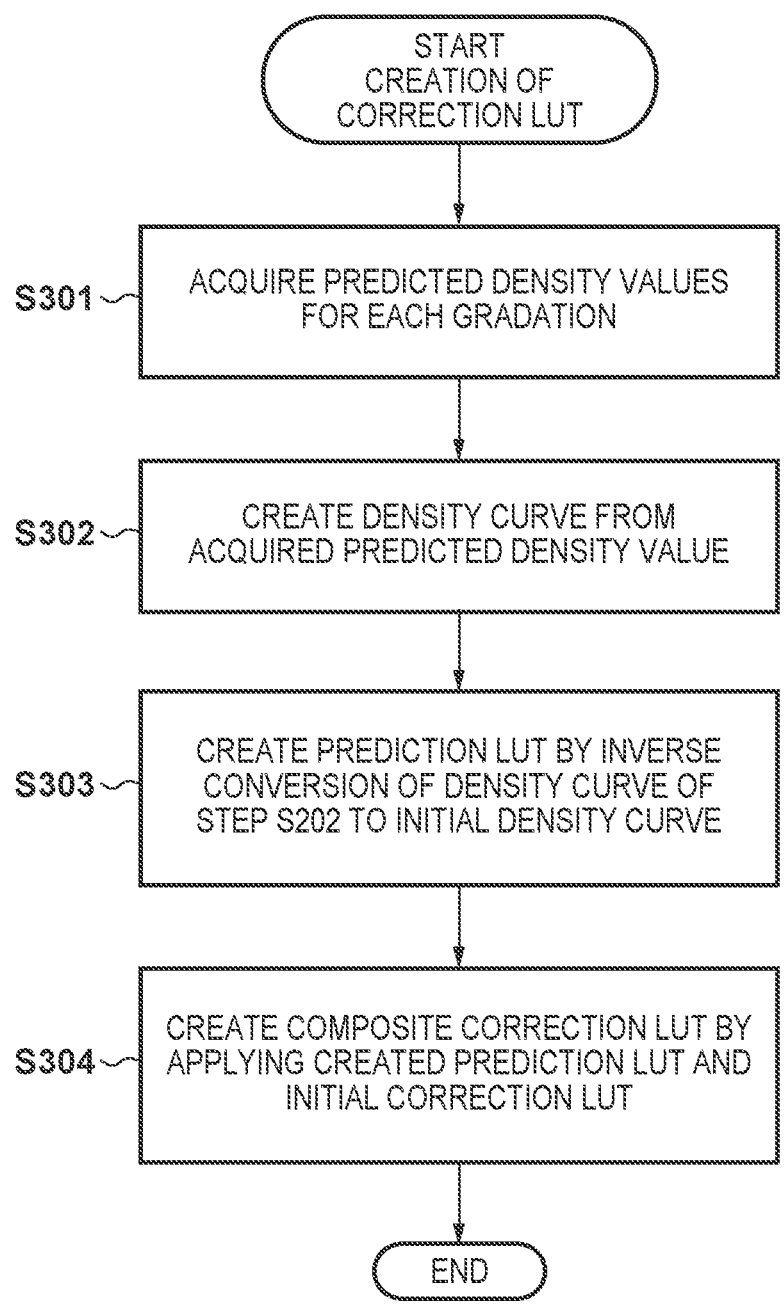
FIG. 10 is a view illustrating a flow for creating a correction LUT from a density prediction value in embodiments.

Thereafter, density values are acquired at a timing set in advance such as when an activation condition for density correction control is satisfied, such as when the power source is turned on, when returning from a sleep, at the time of an environmental variation, and a LUT (hereinafter referred to as a composite correction LUT) at the time of image output is created using the acquired density value. A method of creating a composite correction LUT will be described with reference to FIGS. 10, 11, 12, and 13. FIG. 10 is a flow diagram for creation of a composite correction LUT. The process of FIG. 10 is performed, for example, by a printer controller CPU 313. A density curve described below is a curve indicating a correspondence relationship between the input signal value representing the density and the printed density value (or predicted density value). The density curve may be realized by, for example, a table in which input values and density values are associated with each other. The process of FIG. 10 is executed, for example, at a predetermined prediction control timing. More specifically, the process may be executed every time printing to a predetermined number of sheets (or the number of faces) is completed.

Figure 11:
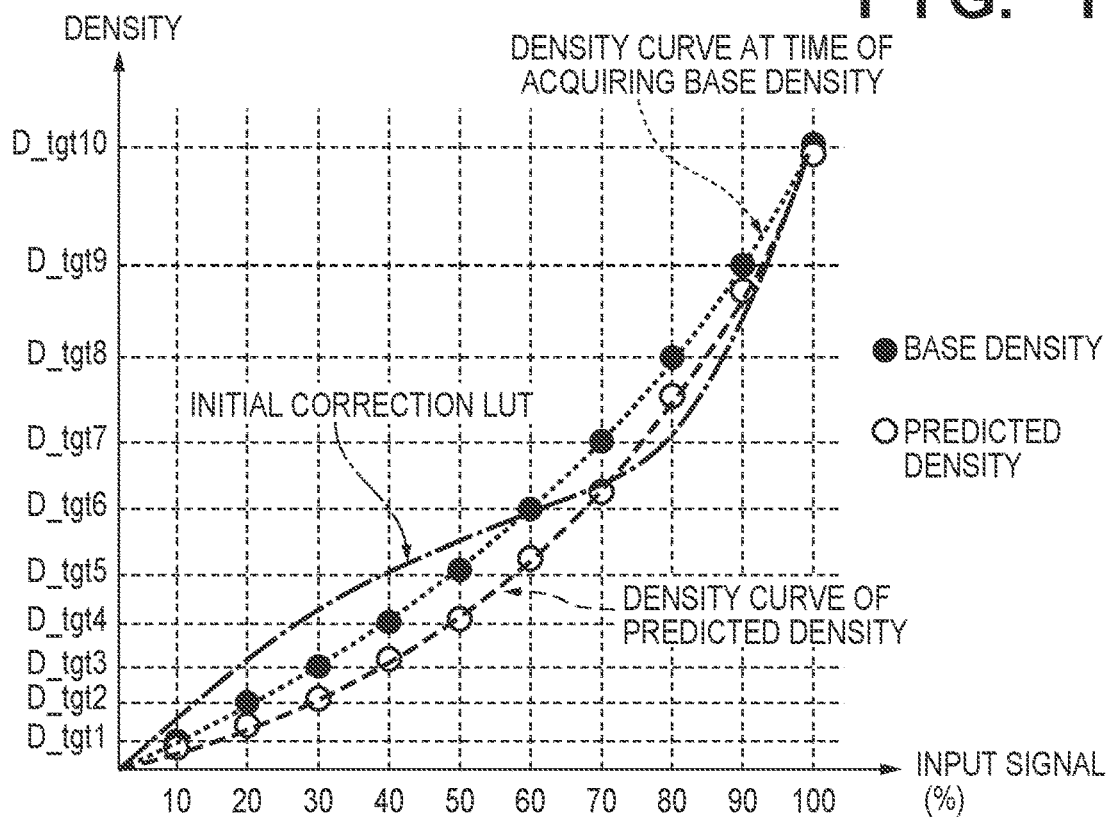
FIG. 11 is a view illustrating a relationship of an initial correction LUT and a base density curve and a predicted density curve in embodiments.

First, predicted density values of test images are acquired (step S301). Acquisition of the predicted densities will be described later with reference to FIG. 15. Next, the obtained predicted density value is plotted for each gray level, and a density curve (broken line) for the predicted density value indicated by the circle point in FIG. 11 is created (step S302). In order to correct the density curve of the predicted density values to the initial density curve, inverse transformation is performed, and an LUT at the time of correction as indicated by a long broken line in FIG. 12 is generated (step S303).

Figure 12:
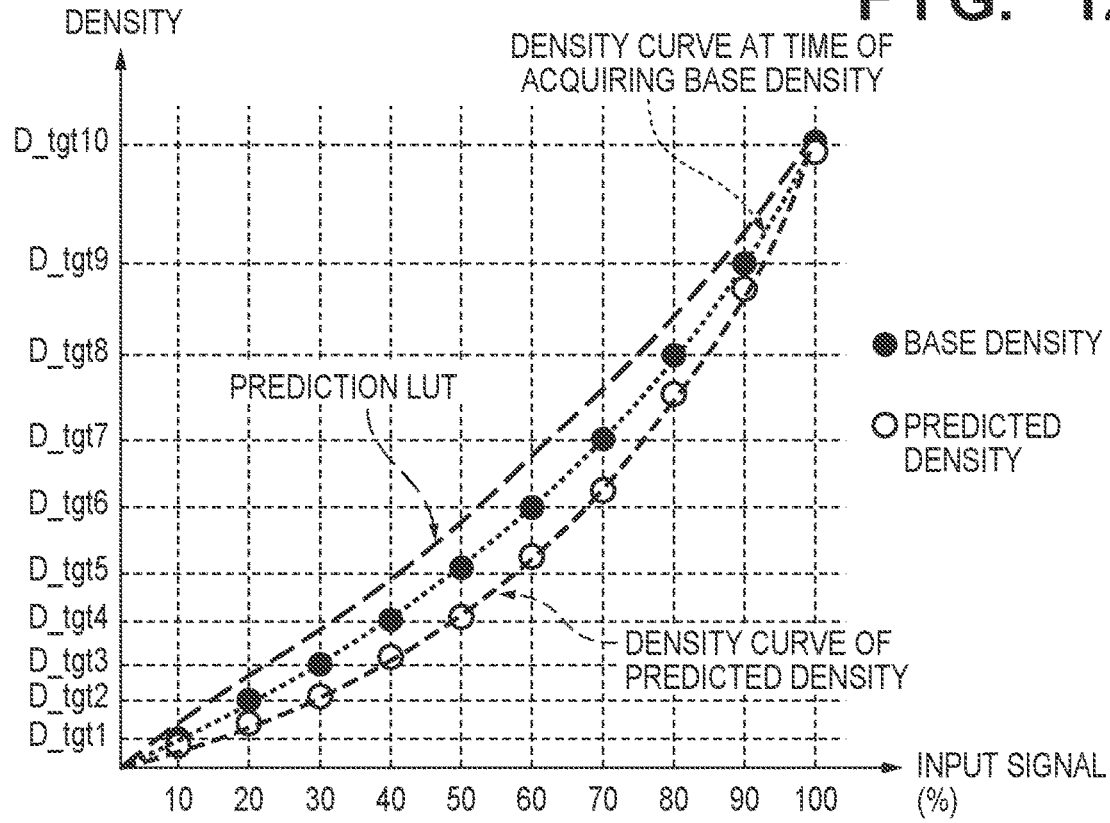
FIG. 12 is a view illustrating a prediction LUT created from a predicted density curve in embodiments.

Here, the initial density curve corresponds to the density curve of the acquired the base density shown in points in FIG. 12. This may be realized by a table in which input signal values and base density values stored in the density storage unit are associated with each other. The curves of the initial correction LUT illustrated in FIG. 11 and FIG. 13 indicate a characteristic for correcting an input signal value so that a relationship between the input signal value and the density is as in the initial density curve when an image is formed based on an output signal value obtained by converting the input signal value with the initial correction LUT. On the other hand, the prediction LUT shown in FIG. 12 is an LUT for converting a predicted density curve (characteristic) corresponding to an input value into a base density curve (characteristic).

Figure 13:
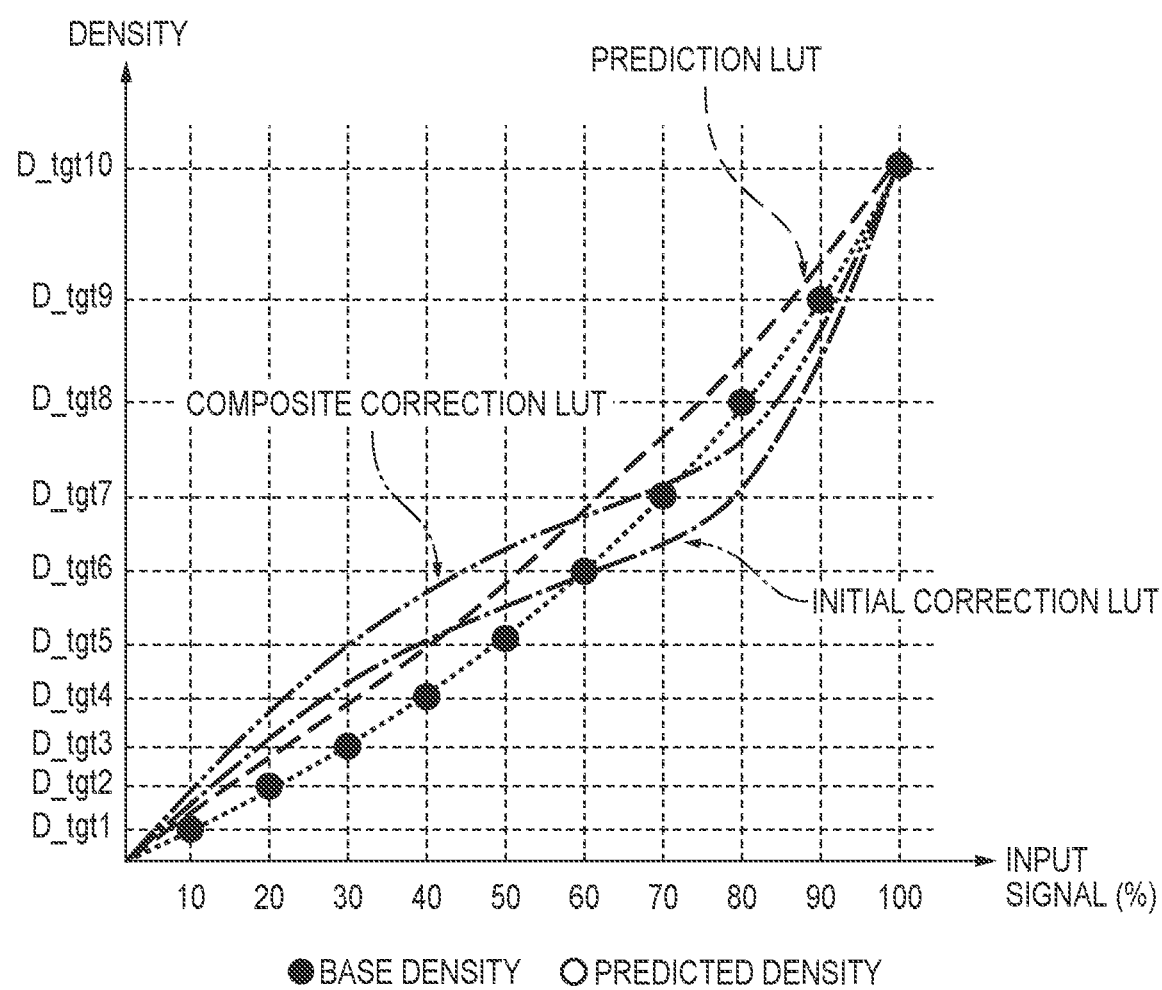
FIG. 13 is a view illustrating a relationship of an initial correction LUT and a prediction LUT and a composite correction LUT in embodiments.

Finally, the prediction LUT and the initial correction LUT are combined (i.e. composited) to generate a composite correction LUT as shown by the long-and-double-short dashed line in FIG. 13 (step S304). The generated composite correction LUT is transferred to, for example, the gradation correction unit 316 and used for gradation correction. The input signal is converted to an output signal by this composite correction LUT, reflected in the output image, and output. The density curve may be generated by a commonly used approximation method such as using an approximation formula that connects 10 points.

(Predicted Density Calculation)

Figure 15:
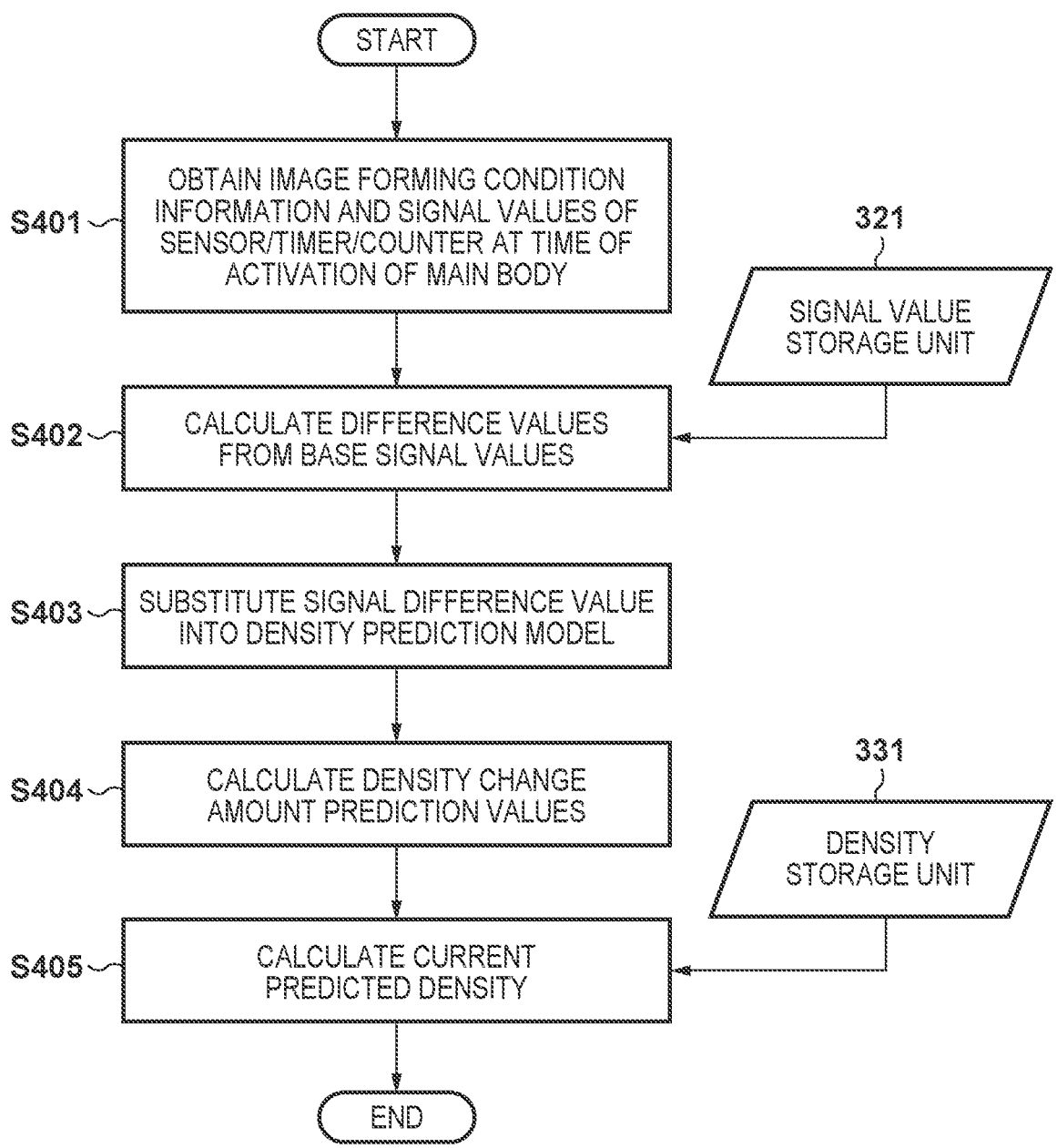
FIG. 15 is a view illustrating a flow for calculating a predicted density from the image density prediction model in embodiments.

On the other hand, the flow of calculating the predicted density values in step S301 is as shown in FIG. 15. In the method of FIG. 15, a flow for predicting density when an activation condition for predicted density correction control is satisfied in a state in which base signal values and base densities have been acquired in advance.

Firstly, when the predicted density correction control is activated, information such as environmental values, a standing time, and a number of times toner replenishment has been performed at the time of activation, and information of an image forming condition for performing image forming are acquired, as an input signal value, from a sensor, timer, and counter provided in the image forming apparatus (step S401). The difference between the acquired signal value and the base signal value stored in advance is extracted (step S402).

Next, the extracted difference values are substituted (step S403) into an image density prediction model equation created based on advanced study, and difference values of the current densities are calculated (step S404), as prediction values, from the base densities. A current predicted density value is calculated from the sum of a difference prediction value and a base density value, and acquires a γ characteristic (step S405). The process of creating the image density prediction model will be described later with reference to FIG. 16.

(Method for Generating a Measured Density Correction LUT)

A method for creating a composite correction LUT in a case where a density correction patch image is created and density is detected will be described with reference to FIG. 19, FIG. 20, FIG. 21, and FIG. 22. In the present embodiment, a method in which patch images whose input values are 30H, 60H, 90H, C0H, and FFH are corrected sequentially will be described, but the invention is not limited thereto.

Figure 20:
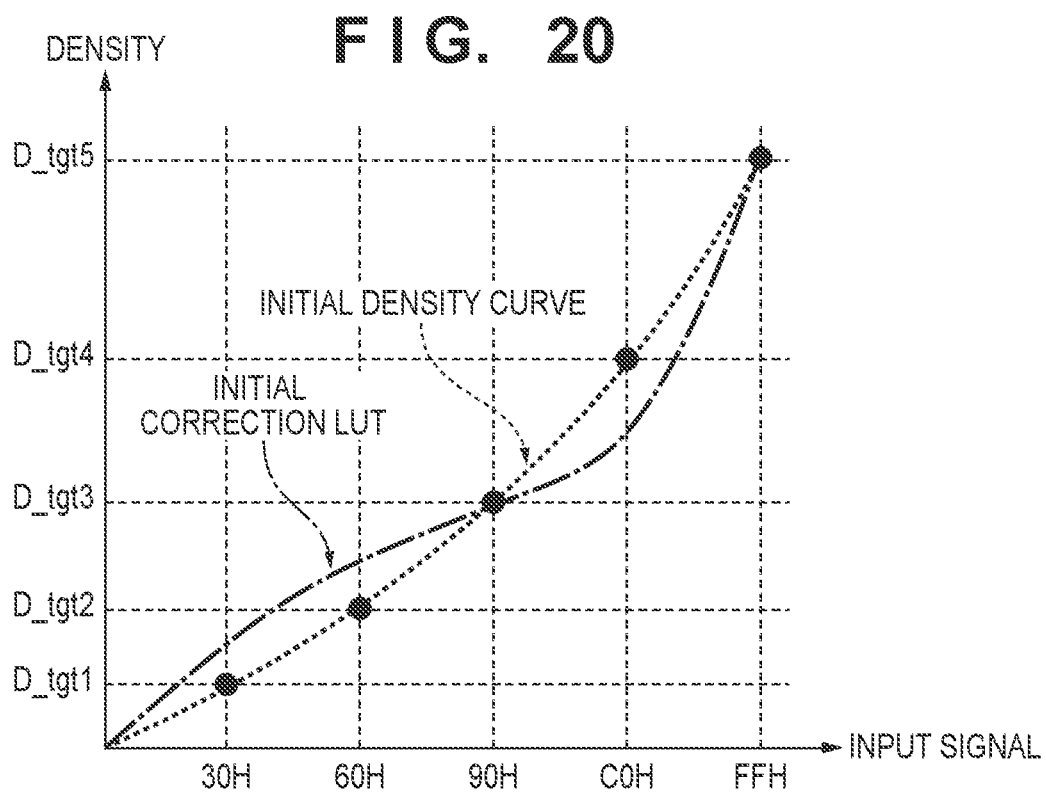
FIG. 20 is a view illustrating a relationship of each LUT at a time of actual measurement control in embodiments.

Patch images are created by applying the current correction LUT. After the automatic gradation correction, a pattern is created, the CPU 313 of the printer controller creates the patch images by applying the initial correction LUT as shown in FIG. 20, which is obtained at the time of the automatic gradation correction, to a test image having a fixed density for density correction, for example, an image with a density value of 30H for each color component (step S901 and step S902). An image of the created pattern is formed, the pattern is detected by a density detection sensor (for example, the density sensor 200), and the detection result is plotted as a detected density for 30H (step S903). Upon the density value is detected, the 30H portion of the initial target density value is newly plotted as indicated by the ○ mark in FIG. 21. That is, 30H, which is the input value, and the detected density value are associated with each other. For 60H, 90H, C0H, and FFH, the density target value taken immediately after creating the initial correction LUT is used. A density curve is created as with the long-and-double-short dashed line illustrated in FIG. 22 by using this newly plotted measured 30H density value and the base densities of the initially measured density values 60H, 90H, C0H, and FFH (step S904). The base density values can be obtained from the density storage unit 331. The density curve may be generated by a commonly used approximation method such as using an approximation method that connects 5 points.

Next, an inverse conversion is performed in order to correct the current density curve created in step S904 to the initial density curve, and a successive correction LUT is created as indicated by the dashed line illustrated in FIG. 22 (step S905).

Figure 21:
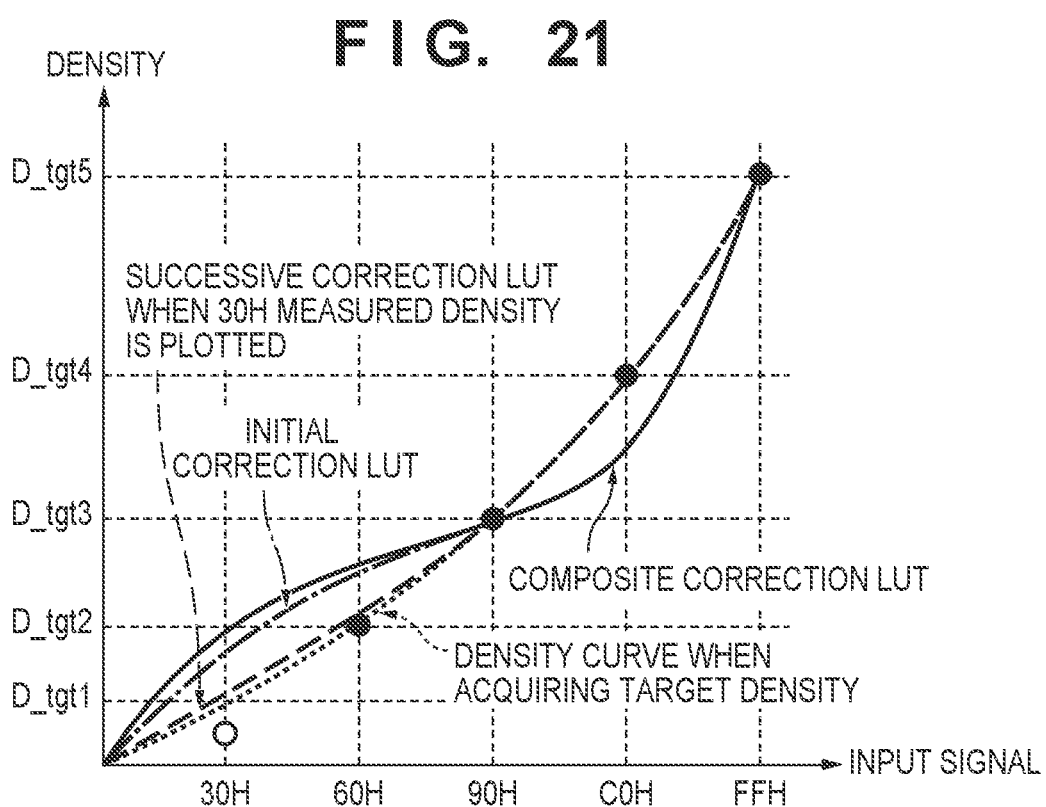
FIG. 21 is a view illustrating a relationship of each LUT at a time of actual measurement control in embodiments.

Finally, a composite correction LUT is generated as shown by the solid line in FIG. 21 by combining the successive correction LUT and the initial correction LUT (step S906), the composite correction LUT is applied to an output image, and the image is outputted. The outputted composite correction LUT is transferred to, for example, the gradation correction unit 316 and used for gradation correction.

After the composite correction LUT is reflected, the output image and the gradation pattern for image density correction in the next sheet interval portion are outputted as an image corrected by the composite correction LUT.

Thereafter, a pattern image of another gradation is continuously generated, density detection is performed, and a composite correction LUT is sequentially generated in the same procedure.

(Normal Density Calculation)

Figure 14:
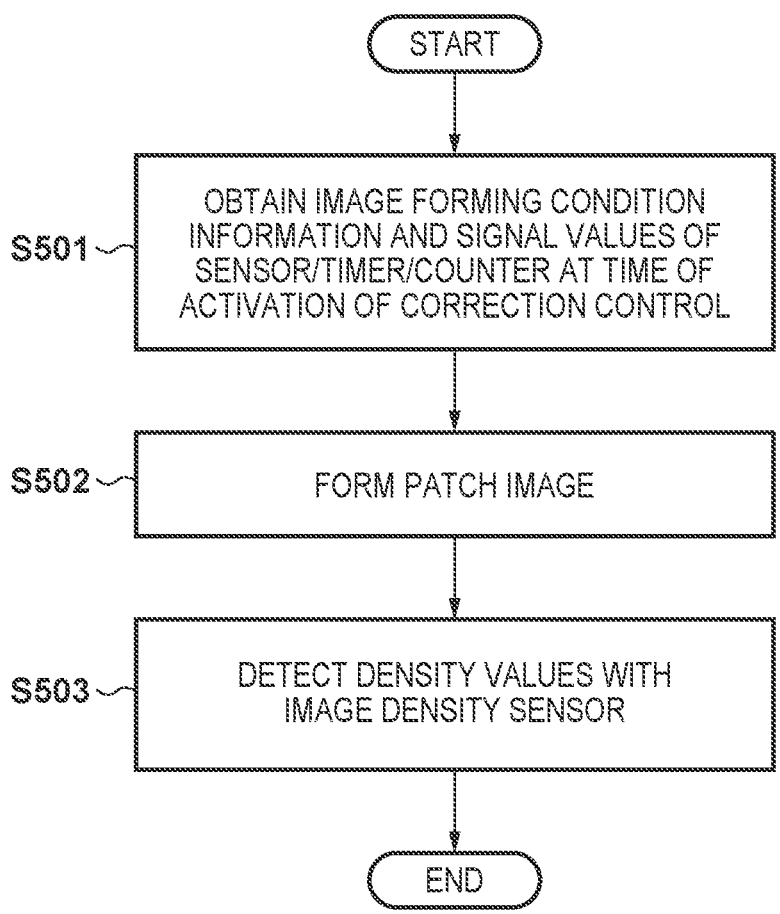
FIG. 14 is a view illustrating a flow for performing formation of a patch image and density calculation in embodiments.

Next, FIG. 14 shows a flow of acquiring density values in the present image forming apparatus in normal (actual measurement-based) density correction control for forming a patch image for density correction. FIG. 14 corresponds to step S901 to step S903 of FIG. 20.

When the activation condition is satisfied, the printer controller CPU 313 acquires, as an input signal values, information such as environmental values, a standing time, and a number of times of toner replenishment at the time of the control operation, and information of an image forming condition for performing image forming from the sensor, timer, and counter provided in the image forming apparatus (step S501). The activation condition is, for example, a density correction control activation condition such as a power source being turned on, reaching a preset number of sheets, or the like. 0

Next, a plurality of toner image patterns are formed under an image forming condition corresponding to the acquired information (step S502).

In the present embodiment, a pattern of 10 gray levels of each color is formed, but the present invention is not limited thereto.

Next, the density of the formed patch image is detected (step S503) on the intermediate transfer member using the image density sensor 200, and density values (γ characteristic) at the time of correction are acquired.

(Density Prediction Model Creation)

The image density prediction model is obtained by using, as input information, information correlated with image density variation (variation correlation information) and using image density information as output information, and expressing the results of the experimentation as a mathematical formula. For this reason, the mathematical formula itself may be referred to as a prediction model, a prediction condition, or a determination condition. The input information includes environmental information that can be obtained from the sensor 200 immediately after the power source of the image forming apparatus is turned on or immediately after a restoration. The input information further includes time information, such as a standing time from a previous print which can be obtained from the timer 201, count information, such as the number of toner replenishments or the number of rotations which can be obtained from the counter 202, and the previous image forming conditions 203 before the image forming apparatus was let stand. The density prediction model in embodiments is a multiple regression model, and in the creation thereof, partial regression coefficients corresponding to respective predetermined input information that is an explanatory variable are determined.

Hereinafter, a procedure for creating an image density prediction model used in the present embodiment in advance is described with reference to a flowchart of FIG. 16. The procedure of this flowchart may be executed by the prediction model correction unit 350 in software (or firmware). This is performed, for example, by the printer controller CPU 313 in hardware. In the present description, a multiple regression model is used as an example, but the present invention is not limited to this multiple regression model and may be a regression model according to another scheme. In addition, it is possible to use only some of the example variables as input values (explanatory variables) and it is possible to include other variables. The creation of the prediction model may be performed individually for each device, or may be performed for a sample device. In the latter case, a prediction model may be prepared for the sample device and applied to the same model of image forming apparatus as the initial prediction model. Further, a plurality of sample devices may be used. The prediction model created here is an initial prediction model that is newly produced and installed on an image forming apparatus in which parts etc. have not been consumed, and the model is updated as described later.

First, a large number of environmental condition variation patterns and image forming conditions variation patterns are prepared, predetermined test images are printed under these conditions, and environmental conditions and image density are measured (step S101). The test image may be an image or the like in which a pattern of predetermined densities are lined up in a predetermined arrangement. Environmental conditions include developer toner density (a ratio of toner to carrier in the developer) at the time of printing, temperature and humidity at various locations, developer toner density at the time of the previous print, standing time since the previous print, and the like. These are environmental information that can be obtained immediately after the power source is turned on. The image forming condition includes a charging potential (hereinafter referred to as Vd) on the photosensitive drums, exposure intensities (hereinafter referred to as LPW), development contrast (hereinafter referred to as Vcont) in the developing portions, and the like. The environmental conditions and image forming conditions to be measured are selected as explanatory variables. Further, the image density means a density of a test image, and is, for example, a density on a photosensitive member of a toner patch, a density on an intermediate transfer member, or a density on a sheet which is a printing medium. In the present example, a case in which, a density on an intermediate transfer member is used for creating the initial prediction model will be described, but other densities may be used. Alternatively, a plurality of densities of measurement values may be used in combination, such as a combination of density on an intermediate transfer member and density on a recording medium.

Next, the variation from the reference value is calculated for the values of the measurement items of environmental variation, image forming condition change, and the image density variation using the first measurement data of each day of experimentation as the reference value (step S102).

Next, the respective measured values of the environmental conditions and image forming conditions classified as identification data are used as input data (explanatory variables), and the coefficients of the multiple regression model are obtained using measured densities that are measured under the respective environmental conditions and image forming conditions as supervisory data (step S103). Coefficients that minimize the error between predicted density values and measured density values are obtained when a predicted density value objective variable is obtained by using each environmental condition and each image forming condition included in the identification data as an explanatory variable. In other words, in step S103, regression model curve fitting is performed. Detailed description thereof will be made after the description of FIG. 16. A multiple regression model is created as described above.

Determining Coefficients

For example, in the following description, as input signal values, the charging potential Vd at the time of printing, the exposure intensity LPW, the developer toner density, and the environmental temperature are described as variation correlation information which is correlated with variation in the density of the image, but the present invention is not limited thereto. Incidentally, items included in the variation correlation information may be included in the base signal values, or may be the same. In addition, regarding the above sensor input values, a four-input first order function model is described, but the invention is not limited thereto, and it is possible to create a regression model by similar processing using five or more sensor inputs and image forming condition inputs.

A linear function model for predicting the image density variation $y_{n\_train}$ as an output variable is created from a combination of four kinds of input variables. Here, input variables $x_{i(n)}$ are defined as LPW variation $x_{1(n)}$, a charging potential variation $x_{2(n)}$, a developer toner density variation $x_{3(n)}$, and an environmental temperature variation $x_{4(n)}$ at the time of printing.

Four-input model:

$$y_{n\_train} = a_1 \times x_{1(n)} + a_2 \times x_{2(n)} + a_3 \times x_{3(n)} + a_4 \times x_{4(n)}$$

(i=1, 2, 3, 4 and n=number of data)

More generally, $y_{n\_train} = \Sigma_i a_i \times x_{i(n)}$.

For this input model, measurement data obtained actually measuring image density variation, which is an output variable, is set as supervisory data $y_{n\_teach}$, and curve fitting is performed on this value. As an example of the curve fitting method, for the coefficients (a1, a2, a3, and a4) of the linear function model, the sum of squares L of the prediction error expressed by the following equation of the predicted values and the measured values is calculated, and the coefficients that minimize this are derived.

The derivation method will be described. First, each variable is expressed in a matrix as follows.

$$y_{n\_teach} = \begin{bmatrix} y_{1\_teach} \\ y_{2\_teach} \\ \vdots \\ y_{n\_teach} \end{bmatrix}, y_{n\_train} = \begin{bmatrix} y_{1\_train} \\ y_{2\_train} \\ \vdots \\ y_{n\_train} \end{bmatrix}, \quad \text{[Equation 1]}$$

$$x = \begin{bmatrix} x_{11} & x_{12} & x_{13} & x_{14} \\ x_{21} & x_{22} & x_{23} & x_{24} \\ \vdots & \vdots & \vdots & \vdots \\ x_{n1} & x_{n2} & x_{n3} & x_{n4} \end{bmatrix}, a = \begin{bmatrix} a_1 \\ a_2 \\ \vdots \\ a_n \end{bmatrix}$$

As described above, the sum of squares of the differences between the predicted values and the measured values is obtained.

$$\sum_{k=1}^{n} (y_{k\_teach} - y_{k\_train})^2 \qquad \text{[Equation 2]}$$
$$= (y_{n\_teach} - y_{n\_train})^T (y_{n\_teach} - y_{n\_train})$$
$$= y^T y - 2y^T x a + a^T x^T x a$$

This expansion of this is the sum of squares L of the prediction error, and the objective is to obtain the matrix a, that is the coefficients (a1, a2, a3, a4) of the linear function model that minimize this L.

That is, the coefficient matrix a that minimizes $$L = y^T y - 2y^T x a + a^T x^T x a, \text{ where } y = y_{n\_teach} \text{ and } y_{n\_train} = xa$$

is obtained.

Therefore, L is set as the objective variable, and an equation where the derivative of L with respect to a is 0 is set, and by solving that the optimal coefficients of the regression model are derived.

First, a differential equation is obtained.

$$\frac{\partial}{\partial a} L = \frac{\partial}{\partial a} \left( y^T y - 2y^T X a + a^T X^T X a \right) \qquad \text{[Equation 3]}$$
$$= -2 y^T X + a^T \left( X^T X + (X^T X)^T \right)$$

Then, this solution is set to 0.

$$-2y^T X + a^T (X^T X + (X^T X)^T) = 0$$

Then, the equation is expanded with a on the left side to obtain a as follows.

$$a = ((X^T X)^T X^T y_{n\_teach})$$

In this way, by obtaining the coefficient a matrix of the multiple regression model as an example of the image density prediction model, it is possible to create a multiple regression model.

In the present embodiment, the input variables are simple variables such as $x_{1(n)}$, $x_{2(n)}$, $x_{3(n)}$, $x_{4(n)}$, but a complex model can also be considered by preparing a product or quotient of environmental conditions and image forming conditions such as $x_{1(n)} \times x_{2(n)}$. For example, an input variable capable of expressing a change in toner charge amount in consideration of the developer toner density and the standing time can be created, and a prediction model can be studied.

(Density Prediction Model Correction)

As described above, when calibration control for density adjustment is performed using an optimal density prediction model individually corresponding to the usage environment, output conditions, and usage conditions, it is necessary to correct the current prediction model. This is because it is typically common to, at an initial stage, use an average model that can cover certain usage environments and situations, which is not always optimal for an individual usage environment.

In order to correct the prediction model, data (measured values) obtained by combining actual density variation with environmental conditions, image forming conditions, and the like is required. Therefore, this is usually performed in conjunction with control to perform density adjustment by actually forming patches for calibration, and data for correcting the prediction model is acquired at the same time as execution of the control (actual measurement control) according to patches.

The data number n is increased and addition is made to the following matrix data.

$$y_{n\_teach} = \begin{bmatrix} y_{1\_teach} \\ y_{2\_teach} \\ \vdots \\ y_{n\_teach} \end{bmatrix}, y_{n\_train} = \begin{bmatrix} y_{1\_train} \\ y_{2\_train} \\ \vdots \\ y_{n\_train} \end{bmatrix}, \quad \text{[Equation 4]}$$

$$x = \begin{bmatrix} x_{11} & x_{12} & x_{13} & x_{14} \\ x_{21} & x_{22} & x_{23} & x_{24} \\ \vdots & \vdots & \vdots & \vdots \\ x_{n1} & x_{n2} & x_{n3} & x_{n4} \end{bmatrix}, a = \begin{bmatrix} a_1 \\ a_2 \\ \vdots \\ a_n \end{bmatrix}$$

Figure 16:
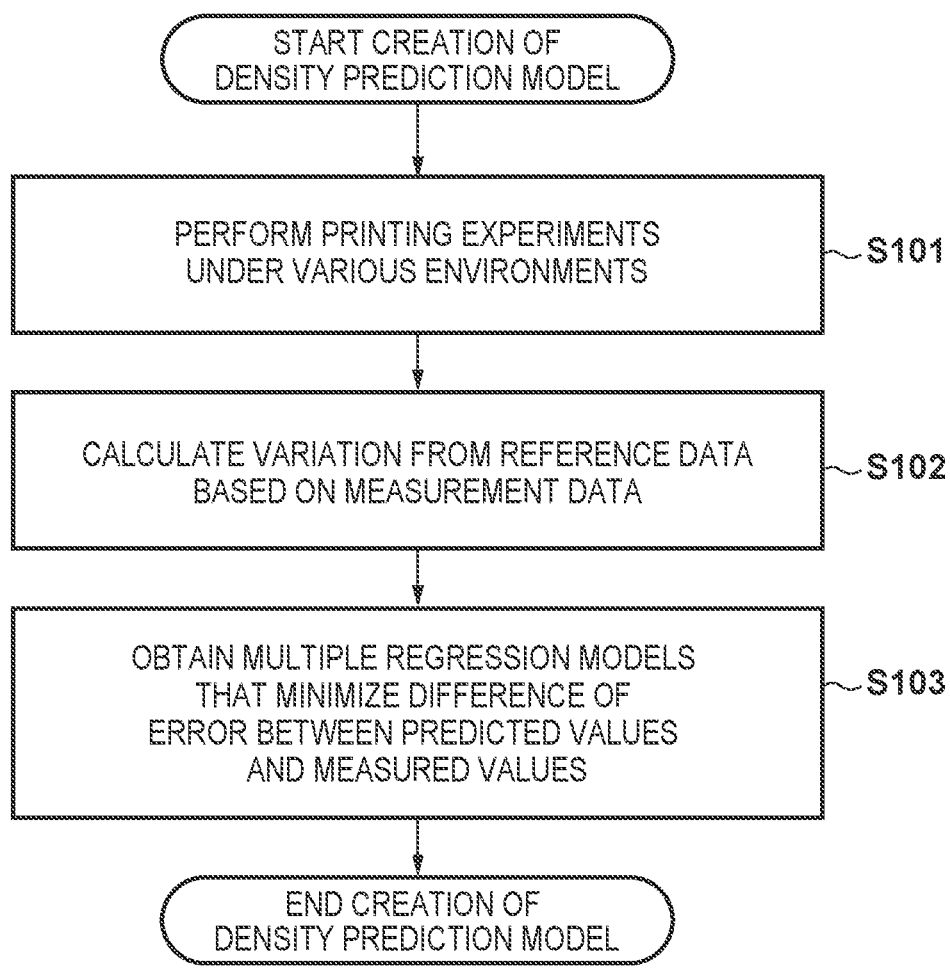
FIG. 16 is a view illustrating a flow for creation of a prediction function model in embodiments.

Then, using each additionally updated variable, a new multiple regression model adapted to the varying environment can be created by again obtaining the coefficient a of the multiple regression model in a similar manner to the above-described flow (i.e., the method shown in FIG. 16 and Equations 1 to 4).

In addition, it is also conceivable to have a configuration in which, when the density prediction model is corrected, correction of the model in which the density prediction is actually operating is performed as necessary, or in which there are a plurality of density prediction models and the model in which the density prediction is actually performed and a density prediction model that is corrected are separately provided.

Further, as described above, the accumulation of data for correcting the density prediction model and the execution of the calculation for actually obtaining the corrected density prediction model can be realized by performing the calculation in the image forming apparatus or by performing the calculation in an apparatus connected to the image forming apparatus via a network. The location of the calculation is not a limitation on the present invention.

(Decision to Switch to a Corrected Density Prediction Model)

In the present embodiment, a method of having a plurality of density prediction models and switching as necessary between a model for performing density prediction and a model that is progressively corrected will be described. In the present embodiment, a configuration in which two models are used selectively will be described. The first model is an average density prediction model A (also referred to as a first determination condition) that can cover certain usage environments and situations. The second model is a corrected density prediction model B (also referred to as a second determination condition), which is progressively corrected as needed in response to the results the correction data. That is, in the present embodiment, the prediction model 3321 has a static prediction model A prepared in advance and prediction model B which is adaptively corrected.

The density prediction model A may be any model prepared in advance. For example, in various use environments, a model created by an above-described procedure may be created and used as the model A. The usage environment may include, for example, temperature and humidity of various locations inside and outside of the device, the standing time of the machine since the previous print, and the like. The densities of test images formed by varying these environmental values may be measured, and a function or table for obtaining density under the environment parameters may be created and used as the density prediction model A. Of course, machine learning may be used to associate the values of parameters with measured density values as teacher data to create a learned model, which is used as the density prediction model A. The model A may be used as an initial model of the density prediction model, and the corrected density prediction model B may be created based thereon.

As described above, internal disturbance and external disturbance factors of the image forming apparatus may change at the time of acquiring a correction data set for correcting the density prediction model B and at the time of updating or switching the density prediction model to the corrected density prediction model B. In such a case, the difference between the predicted density and the measured density may be worse for the corrected second model B than for the average model A, which is the first model.

Therefore, in the present embodiment, before switching the density prediction model to the second corrected model B, each of the predicted densities of the two models of the density prediction model A and the corrected density prediction model B is compared with an actual measured density detected by actually forming toner patches. Then, it is determined whether or not to switch to the corrected model B in accordance with the result obtained by the comparison.

Figure 17:
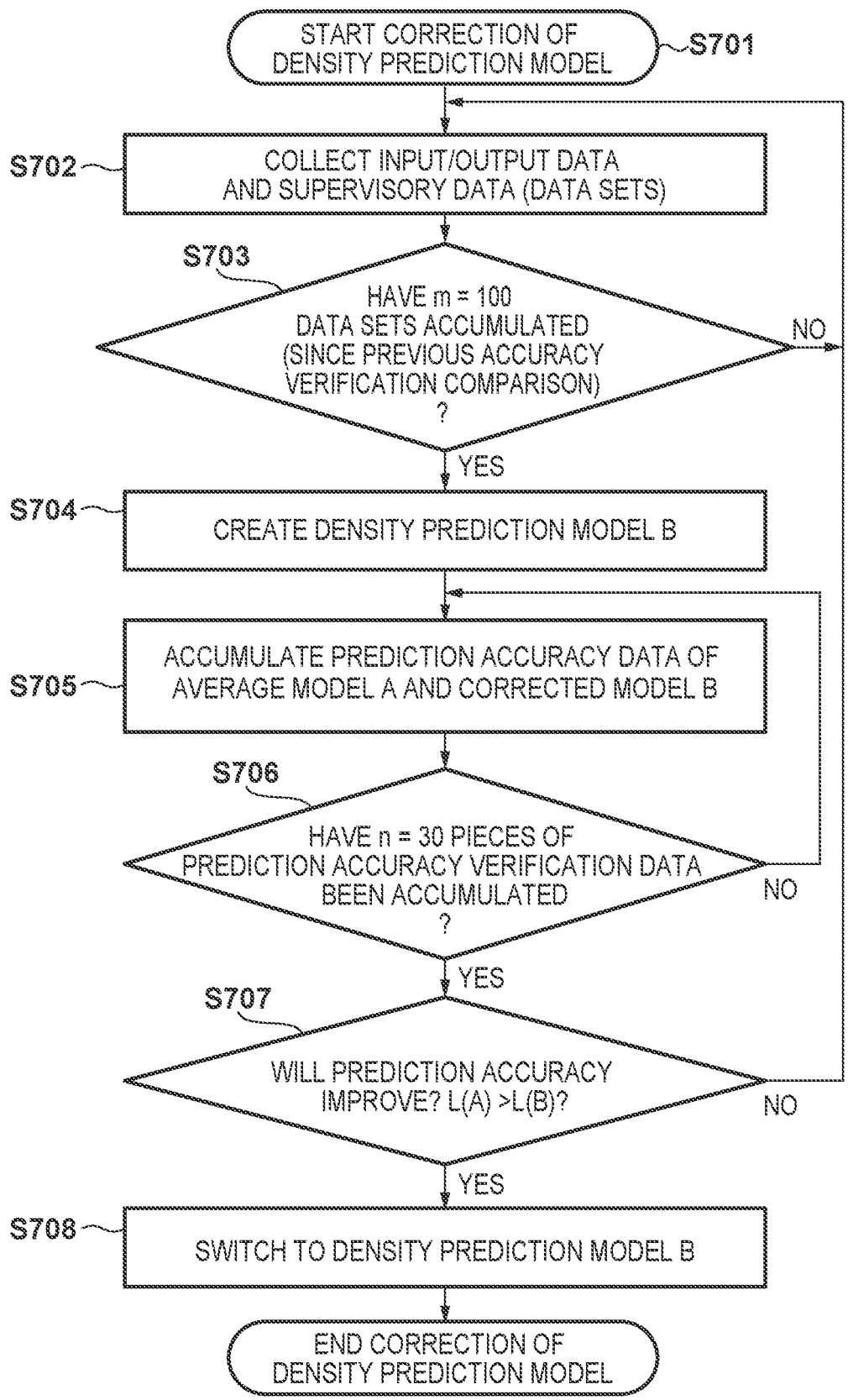
FIG. 17 is a view illustrating a flow for switching of density prediction models in a first embodiment.

This will be described below using FIG. 17. In the present embodiment, first data acquired at the time of a first calibration is used to create a corrected density prediction model for the first time when a predetermined data number m=100 has been accumulated. When density prediction control using the density prediction model is started (step S701), collection of a data set for correcting the prediction model is started. A data set that matches actual density variations with environment, output conditions, and the like is accumulated each time control for actually forming calibration patches and performing density adjustment is performed (step S702). That is, together with the operation of the image forming apparatus, variation correlation information correlated with density variation and the corresponding measured density values are accumulated. Calibration may be performed from the first time to the m-th time using the density prediction model A.

The corrected density prediction model B is created (step S704) when it is determined (step S703) that m data sets have been acquired after starting to collect the predetermined number m (for example, 100) data sets at the initial correction timing (in other words, when it is determined that m data sets have been acquired). Here, the density prediction model is created from m data sets by a model creation method described above.

After the corrected density prediction model B is created, prediction accuracy data is accumulated in order to verify the accuracy of the average density prediction model A prepared in advance and the corrected density prediction model B created this time (step S705). The prediction accuracy data is a difference between actual densities of toner patches and predicted densities obtained from a result of inputting information such as environment and output conditions into the density prediction models. n=30 such differences are obtained for each of the density prediction model A and the density prediction model B, and the process proceeds to accuracy verification (YES in step S706). Here, the sum of squares of the differences described above is obtained in the respective density prediction models.

For example, a test image including 30 patches having different densities is formed on, for example, an intermediate transfer belt, and the test image is detected by the density sensor 200, so that prediction accuracy data can be obtained. Alternatively, upon each calibration by actual measurement, predicted values predicted by the prediction model A may be accumulated together with measured values, and assuming a predicted value and a corresponding measured value to be one set, the calibration may be repeated until 30 sets of data are accumulated. The test image may be stored in the image forming apparatus in advance. Since a test image is formed for each color, the total number of patches is 120. Then, the sum of squares L of the differences between predicted density and measured density is obtained for each prediction model as in the following equations.

$$L(A) = \sum_{n=1}^{m}(y_{n\_teach} - y_{n\_train\_A})^2$$

$$L(B) = \sum_{n=1}^{m}(y_{n\_teach} - y_{n\_train\_A})^2$$

L(A) is the sum of the squares of the differences for prediction model A and L(B) is the sum of the squares of the differences for prediction model B. For example, $y_{n\_teach}$ is a measured value of the density for the n-th color (patch). $y_{n\_tram\_A}$ is a predicted value of the density for, for example, the n-th color (patch) according to the prediction model A, and $y_{n\_train\_B}$ is a predicted value of the density for, for example, the n-th color (patch) according to the prediction model B. Here, m is 30.

When the predetermined number of prediction accuracy data have been accumulated (YES in step S706), the magnitude relationship between L(A) and L(B), which are the sums of squares of the predicted density and the measured density, is determined (step S707), and when L(A)>L(B), the density prediction model is switched to the corrected prediction model B (step S708). That is, if the difference between the predicted density and the measured density is larger in the prediction model A, the prediction model B is selected, and the prediction model B is used for calibration using the predicted values in the future. Conversely, if the difference between the predicted density and the measured density is larger in the prediction model B, the prediction model A is selected, and the prediction model A is used for calibration using the predicted values in the future. If the differences are equal, the currently used prediction model may continue to be selected, or a predecided prediction model may be selected. Switching the prediction model may, for example, switch the set of coefficients used in each model.

When the accuracy of the corrected density prediction model would become worse since L(A)<L(B) in the verification of the prediction accuracy, the flow returns to continuing to accumulate the correction data set (step S702). Then, the accumulation of data is started again up to a predetermined data set m=100. Here, the prediction accuracy verification data n=30 accumulated in the above-described flow in step S706 can be re-used as the correction data for step S702.

When m=100 data for correcting the model again are newly acquired after the previous accuracy verification comparison (step S707), the next corrected model B is created. For example, there may be cases where the correction of the density prediction model and the verification of the prediction accuracy have been performed once previously, but at that time, no improvement of the prediction accuracy was observed, and correction of the prediction model may be a second flow. In such a case, it is also possible to add 100 newly acquired second data sets to the first 100 data sets. At this time, the upper limit of the total number of data sets is set to 1000 as an example, and when more data is accumulated, for example, older data is removed from the correction data set. In other words, data is removed from the correction data set from the oldest data until the number of data sets is not greater than the maximum number. This makes it possible to create a density prediction model according to a more recent image forming situation.

In the method of adding newly acquired data to data acquired in the past as described above, the difference between the predicted density and the actual density is not created in accordance with only the data obtained from the latest engine state. On the other hand, it enables the creation of a model with relatively high versatility according to a plurality of data sets over a longer period of time.

In this manner, the average density prediction model A which is held in advance is switched to the corrected density prediction model B obtained from data set information obtained from the individual image forming apparatus. In such a configuration, the models are switched after accuracy verification of the density prediction model A and the density prediction model B is performed. This makes it possible to more reliably use the model with the higher prediction accuracy to perform density prediction. Thus, by performing this density prediction, it becomes possible to provide an image forming apparatus having higher density stability.

Second Embodiment

The first embodiment describes a method of switching the density prediction model to the corrected density prediction model only once. However, since the state of the image forming apparatus constantly continues to change, it is possible continue to execute highly accurate density prediction that follows the changes in state by continuing to correct the density prediction model.

In the present embodiment, a configuration in which the corrected density prediction model is constantly updated will be described. In order to realize this configuration, the present embodiment uses a configuration having an average density prediction model A held in advance as described in the first embodiment and two models (a model B1 and a model B2) as density prediction models for which the model is corrected in accordance with the state of the image forming apparatus. The model B1 may be referred to as a first determination condition, and the model B2 may be referred to as a second determination condition. In the present embodiment, for example, a prediction model corresponding to the prediction model A of the first embodiment may be prepared in advance as an initial value of the prediction model B1. Whereas the prediction model A is not updated in the first embodiment, in the present embodiment, the prediction model of the two prediction models B1 and B2 which is not used, that is, the one which is not selected, is updated. Thus, even when a prediction model that deviates specifically is created (or updated), by using the more accurate prediction model, it is possible to maintain the quality of the calibration and thus the quality of the image formed.

Figure 18A:
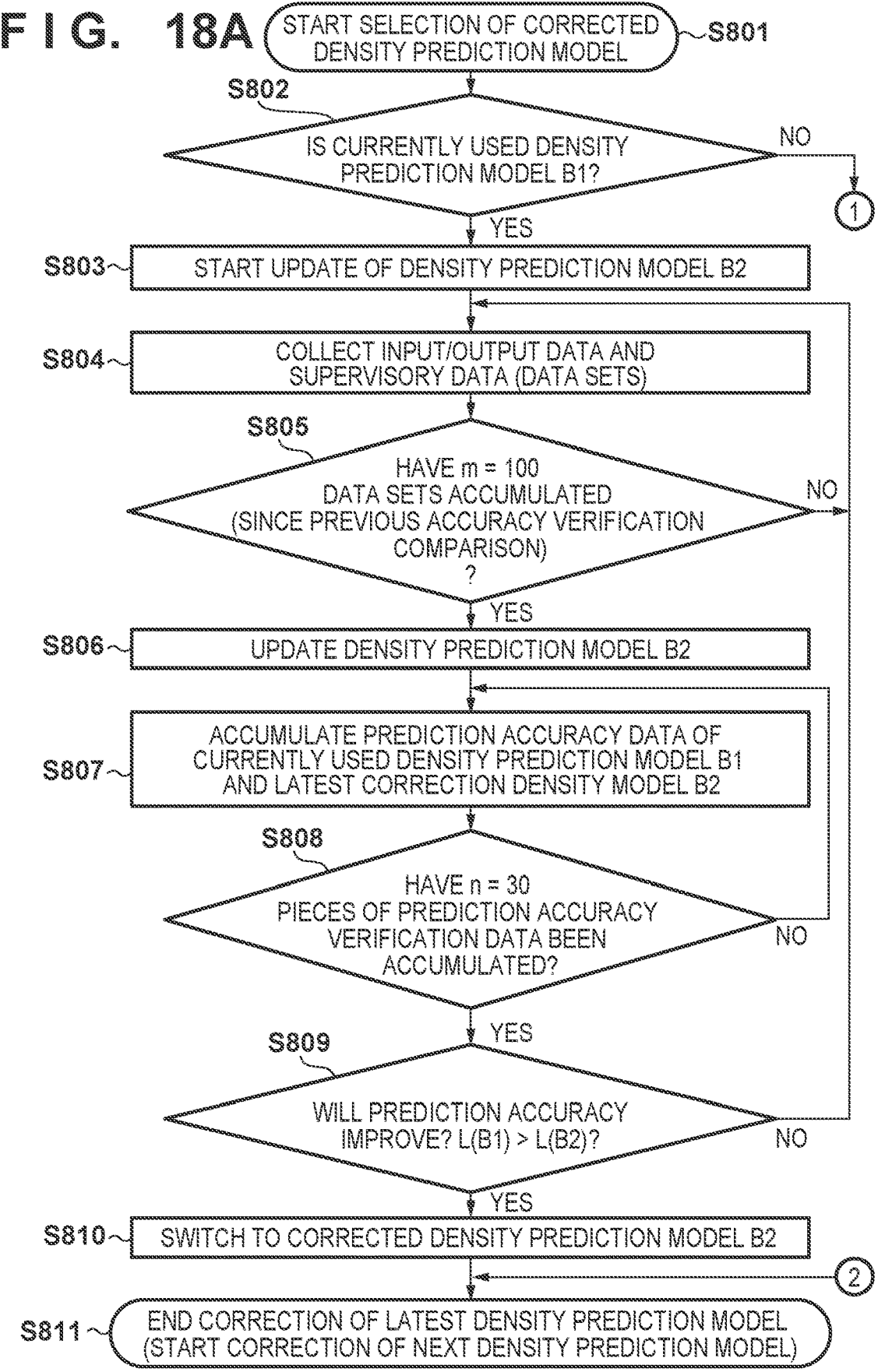
FIGS. 18A and 18B are views illustrating flows for switching of density prediction models in a second embodiment.
Figure 18B:
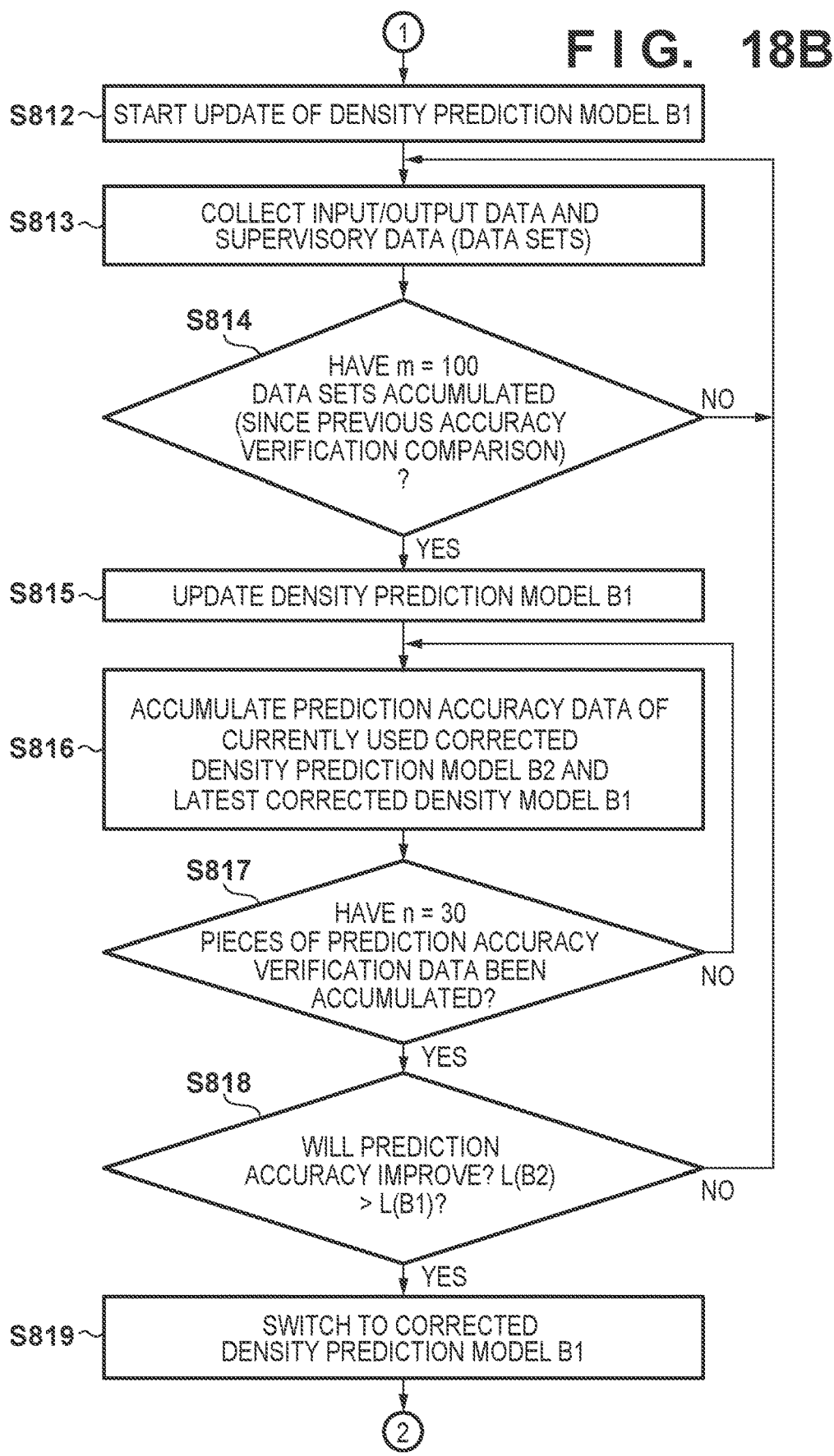
Figure 19:
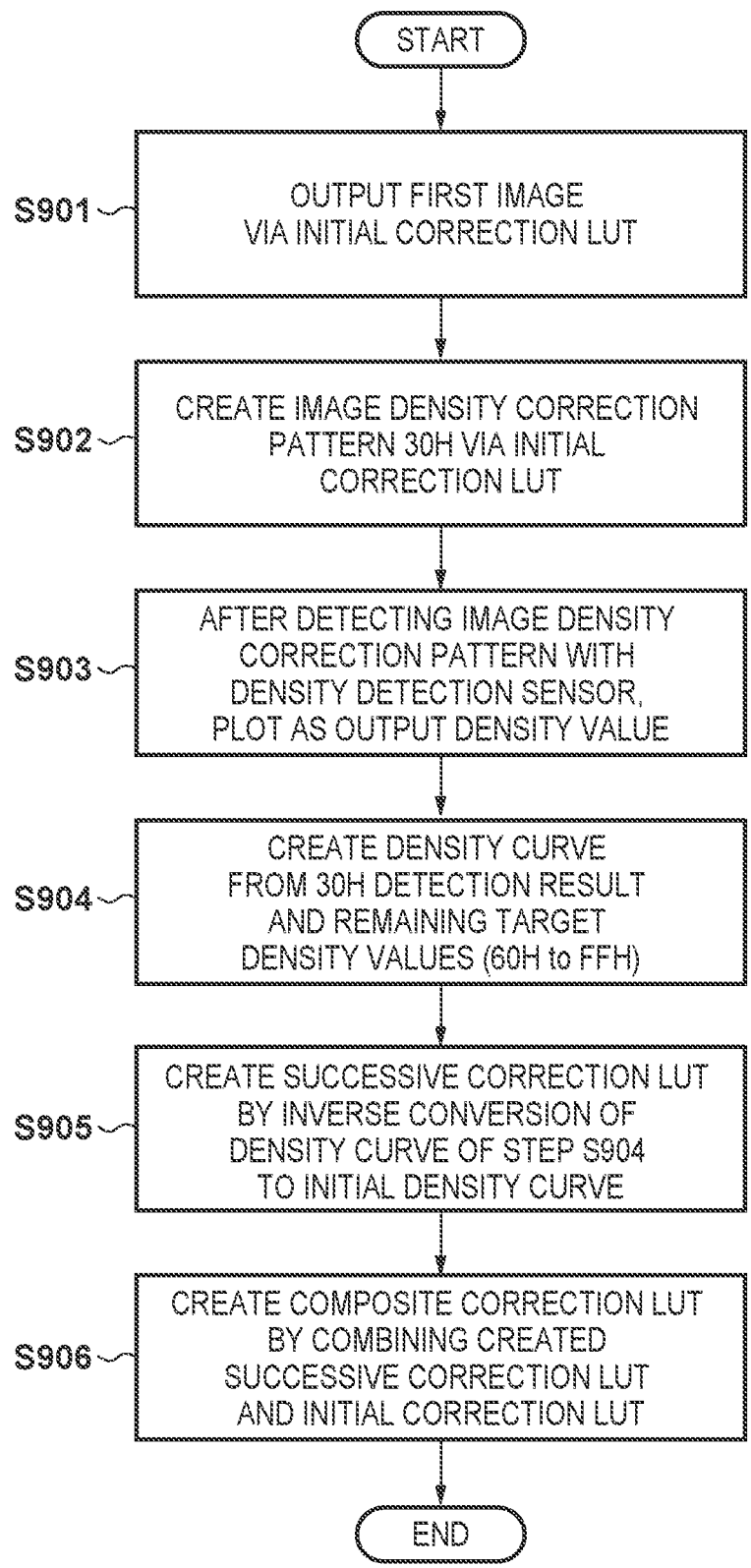
FIG. 19 is a flow for creating a composite LUT at a time of actual measurement control in embodiments.

The first embodiment describes a flow of switching the density prediction model used for the density correction control from the average density prediction model held in advance in the image forming apparatus to the corrected density prediction model held in the individual image forming apparatus. In the present embodiment, after switching to the corrected density prediction model B1, a flow of continuously creating an optimized corrected density prediction model as appropriate using a still different corrected density prediction model B2 and selecting the corrected density prediction model each time will be described with FIG. 18A to FIG. 18B.

First, the selection of the corrected density prediction models B1 and B2 is started (step S801). First, the density prediction model currently being used for the density correction control is determined (step S802). If the prediction model being used is not the model B1, the prediction model being used is determined to be the model B2 (NO in step S802), and the process branches to step S812. When it is determined in step S802 that model B1 is being used (YES in step S802), the process branches to step S803. Hereinafter, a case where the density prediction model B1 is currently being used will be described.

In this case, the creation of the density prediction model B2 is started (step S803), and data sets of teacher data which is the density information of the actually measured toner patches, input data of the time of image formation of the measured patch, and predicted densities according to model B2 are accumulated (step S804). The input data includes environment; output conditions; and the like of the time of image formation. Control for actually forming patches for calibration to perform density adjustment is also employed, and thereby data for simultaneously correcting the prediction model is acquired when executing control according to the patches.

When the data number for model correction to be newly added reaches m=100 (step S805) after the immediately previous verification of the accuracy of the prediction model, the density prediction model B2 is updated (step S806). Note that the update newly creates the density prediction model B2 when it does not yet exist.

Although m=100 data sets are newly acquired here, the data number used for prediction model correction is not limited to newly acquiring m=100 data, and previously acquired model correction data may be used. However, since increasing the data number endlessly is difficult in terms of data storage implementation, it is desirable to replace old data with newly acquired data when a certain upper limit is exceeded, for example. For example, 1000 pieces of data may be used as the upper limit on the total number of accumulated data for model correction. This makes it possible to correct the model while securing a data number necessary for obtaining a stable model and including the latest state of the image forming apparatus. In addition, the data accumulated for the model correction can be shared as data for updating the density prediction models B1 and B2.

After the density prediction model B2 is updated, accumulation of data for verifying the prediction accuracy of the density prediction model B1 that is currently being used for the density correction control and the density prediction model B2 created this time is started (step S807).

The content of the prediction accuracy data is similar to that described in the first embodiment, and in the present embodiment, and the process proceeds to accuracy verification when n=30 data sets have been obtained for the density prediction model B1 and the density prediction model B2, respectively (step S808). Here, the following two types of sums of squares are obtained for the respective density prediction models. This may be done by replacing the prediction model A and the prediction model B of the first embodiment with the prediction model B1 and the prediction model B2, respectively.

$$L(B1) = \sum_{n=1}^{m}(y_{n\_teach} - y_{n\_train\_B1})^2$$

$$L(B2) = \sum_{n=1}^{m}(y_{n\_teach} - y_{n\_train\_B2})^2$$

L(B1) is the sum of the squares of the differences for prediction model B1, and L(B2) is the sum of the squares of the differences for prediction model B2. For example, $y_{n\_teach}$ is a measured value of the density for the n-th color (patch). $y_{n\_train\_B1}$ is a predicted value of the density for, for example, the n-th color (patch) according to the prediction model B1, and $y_{n\_train\_B2}$ is a predicted value of the density for, for example, the n-th color (patch) according to the prediction model B2. Here m is assumed to be 30.

When the predetermined number of prediction accuracy data has been accumulated (YES in step S706), the magnitude relationship between L(B1) and L(B2), which are the respective sums of squares of the predicted density and the measured density, is determined (step S809). As a result, if L(B1)>L(B2), the density prediction model is switched to the corrected prediction model B2 (step S810). Then, the current density prediction model correction is finished, and the next density prediction model correction is started (step S811). In this explanation, the density prediction model B2 is corrected to improve the accuracy of the density prediction, so the model used for the density correction control is switched to the density prediction model B2. However, if no improvement is seen in the prediction accuracy in the current model correction in step S809, the flow will continue to collect data sets of the input/output data and the teacher data, and attempt to improve the model. (step S804 to step S809).

A description has been given of the flow (step S803 to step S810) where the prediction model B1 is currently being used for the density correction control and the density prediction model B2 is updated. In the other case of the flow where the prediction model B1 is used for the density correction control, and the prediction model B2 is updated (step S812 to step S819) is similar.

Thus, in order to correct the density prediction model, two models (the corrected prediction model B1 and the prediction model B2) are held, and correction of a model is performed as necessary in parallel with use of a model for the density correction control. By doing so, the density prediction model can be corrected with data including the latest state of the image forming apparatus. Then, by switching models after having further verified the accuracy of the updated density prediction model, it is possible to more reliably adopt a model with higher prediction accuracy and perform density prediction, thereby making it possible to provide an image forming apparatus with higher density stability.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-158394, filed Sep. 28, 2021, which is hereby incorporated by reference herein in its entirety.

What is claimed is:

1. An image forming apparatus, comprising:
an image forming unit configured to form an image based on an image forming condition; and
a controller configured to:
determine, based on a determination condition, information related to a density of an image to be formed by the image forming unit;
generate the image forming condition based on the information;
acquire measurement data related to a test image formed by the image forming unit, the measurement data being outputted from a sensor;
determine, based on a first determination condition, first information related to a density of the test image;
determine, based on a second determination condition, second information related to a density of the test image; and
based on the first information, the second information, and the measurement data, select the determination condition from among a plurality of determination conditions including the first determination condition and the second determination condition.

2. The image forming apparatus according to claim 1, wherein
the image forming unit includes an intermediate transfer member onto which the image is transferred and a transfer member configured to transfer the image from the intermediate transfer member to a sheet; and
the sensor is an optical sensor configured to measure the test image on the intermediate transfer member.

3. The image forming apparatus according to claim 1, wherein
the test image includes images of different densities, and
the controller, based on a) the first information which is related to densities of the images, b) the second information which is related to densities of the images, and c) the measurement data which is related to the images, selects the determination condition from among the plurality of determination conditions.

4. The image forming apparatus according to claim 1, wherein
the controller determines first difference data based on the first information and the measurement data, determines second difference data based on the second information and the measurement data, and selects the second determination condition as the determination condition in a case where the first difference data is greater than the second difference data.

5. The image forming apparatus according to claim 4, wherein
the controller selects the first determination condition as the determination condition in a case where the first difference data is less than the second difference data.

6. The image forming apparatus according to claim 1, wherein
the controller further acquires environmental information, and
the controller further generates the second determination condition based on measurement data of another test image, the environmental information, and the image forming condition.

7. The image forming apparatus according to claim 1, wherein
the controller determines the information from the image forming condition based on the determination condition.

8. The image forming apparatus according to claim 1, wherein
the controller further acquires environmental information, and
the controller determines the information from the environmental information based on the determination condition.

9. The image forming apparatus according to claim 1, wherein
the image forming apparatus further comprises a counter, and
the controller determines the information from a count value of the counter based on the determination condition.

* * * * *